US012228499B2

(12) United States Patent
Jung et al.

(10) Patent No.: US 12,228,499 B2
(45) Date of Patent: Feb. 18, 2025

(54) PUPIL ELLIPSOMETRY MEASUREMENT APPARATUS AND METHOD AND METHOD OF FABRICATING SEMICONDUCTOR DEVICE USING THE PUPIL ELLIPSOMETRY MEASUREMENT METHOD

(71) Applicant: SAMSUNG ELECTRONICS CO., LTD., Suwon-si (KR)

(72) Inventors: Jaehwang Jung, Suwon-si (KR); Yasuhiro Hidaka, Yokohama (JP); Mitsunori Numata, Yokohama (JP); Wookrae Kim, Suwon-si (KR); Jinseob Kim, Incheon (KR); Myungjun Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 18/111,229

(22) Filed: Feb. 17, 2023

(65) Prior Publication Data

US 2023/0204493 A1 Jun. 29, 2023

Related U.S. Application Data

(63) Continuation of application No. 17/204,059, filed on Mar. 17, 2021, now Pat. No. 11,604,136.

(30) Foreign Application Priority Data

Sep. 8, 2020 (KR) .................. 10-2020-0114868

(51) Int. Cl.
*G01N 21/21* (2006.01)
*G01N 21/95* (2006.01)
*G02B 27/10* (2006.01)

(52) U.S. Cl.
CPC ....... *G01N 21/211* (2013.01); *G01N 21/9501* (2013.01); *G02B 27/10* (2013.01); *G01N 2021/214* (2013.01)

(58) Field of Classification Search
CPC .......... G01N 2021/214; G01N 21/211; G01N 21/9501; G02B 27/10
See application file for complete search history.

(56) References Cited

U.S. PATENT DOCUMENTS

| 6,429,943 B1 | 8/2002 | Opsal et al. |
| 7,428,057 B2 | 9/2008 | De Lega et al. |
| 7,791,727 B2 | 9/2010 | Den Boef et al. |

(Continued)

FOREIGN PATENT DOCUMENTS

WO 0003228 A1 1/2000

*Primary Examiner* — Hina F Ayub
(74) *Attorney, Agent, or Firm* — Sughrue Mion, PLLC

(57) ABSTRACT

Provided is a pupil ellipsometry measurement apparatus configured to measure an object, the pupil ellipsometry measurement apparatus including a stage configured to support the object to be measured, a light source unit configured to generate and output light, an irradiation optical system configured to focus the light from the light source unit on the object, a first detector configured to detect an image of reflected light from the object on an imaging plane, a self-interference generator (SIG) configured to generate self-interference with respect to the reflected light, a second detector configured to detect a hologram image of interference light of the SIG on a pupil plane, and a processor configured to reconstruct reflectance information based on the hologram image, and measure the object.

19 Claims, 21 Drawing Sheets

(56) References Cited

U.S. PATENT DOCUMENTS

| | | |
|---|---|---|
| 7,978,337 B2 | 7/2011 | De Groot et al. |
| 8,115,926 B2 | 2/2012 | Straaijer |
| 8,854,628 B2 | 10/2014 | Colonna de Lega et al. |
| 9,310,290 B2 | 4/2016 | Wang et al. |
| 2007/0268490 A1 | 11/2007 | Kawakami |
| 2018/0144995 A1 | 5/2018 | Kim |
| 2020/0072599 A1 | 3/2020 | Van Dam et al. |
| 2020/0192283 A1 | 6/2020 | Kim et al. |
| 2021/0025757 A1 | 1/2021 | Yamamoto |
| 2021/0262921 A1 | 8/2021 | Boosalis |

Hologram

Frequency Domain

PUPIL ELLIPSOMETRY MEASUREMENT APPARATUS AND METHOD AND METHOD OF FABRICATING SEMICONDUCTOR DEVICE USING THE PUPIL ELLIPSOMETRY MEASUREMENT METHOD

CROSS-REFERENCE TO RELATED APPLICATION

This application is a continuation of U.S. application Ser. No. 17/204,059, filed Mar. 17, 2021, which claims priority to Korean Patent Application No. 10-2020-0114868, filed on Sep. 8, 2020, in the Korean Intellectual Property Office, the disclosure of which is incorporated by reference herein in its entirety.

BACKGROUND

Example embodiments of the present application relate to a measurement apparatus and method, and more particularly, to a measurement apparatus and method based on ellipsometry.

Ellipsometry is an optical technique for investigating the dielectric properties of wafers. Ellipsometry may yield information about a sample by analyzing a change in polarization of light reflected from the sample (e.g., a surface of a wafer). For example, when light is reflected from a sample, the polarization state of reflected light varies with the optical properties, the thickness, and the like of the sample. Ellipsometry may obtain a basic physical quantity (e.g., a complex refractive index or a dielectric function tensor) of a material by measuring a change in polarization, and thus deduce information, such as the form of a material, a crystalline state, a chemical structure, and an electrical conductivity, of a sample.

SUMMARY

One or more example embodiments provide a pupil ellipsometry measurement apparatus and method for quickly and accurately measuring an object, and a method of fabricating a semiconductor device using the pupil ellipsometry measurement method.

According to an aspect of an example embodiment, there is provided a pupil ellipsometry measurement apparatus configured to measure an object, the pupil ellipsometry measurement apparatus including a stage configured to support the object to be measured, a light source unit configured to generate and output light, an irradiation optical system configured to focus the light from the light source unit on the object, a first detector configured to detect an image of reflected light from the object on an imaging plane, a self-interference generator (SIG) configured to generate self-interference with respect to the reflected light, a second detector configured to detect a hologram image of interference light of the SIG on a pupil plane, and a processor configured to reconstruct reflectance information based on the hologram image, and measure the object.

According to another aspect of an example embodiment, there is provided a pupil ellipsometry measurement apparatus configured to measure an object, the pupil ellipsometry measurement apparatus including a stage configured to support the object to be measured, a light source unit configured to generate and output light, a first polarizer configured to polarize the light from the light source unit, an objective lens configured to focus light from the first polarizer on the object, a beam splitter configured to split reflected light from the object, a first detector configured to detect an image of a portion of the reflected light from the beam splitter on an imaging plane, a self-interference generator (SIG) configured to generate self-interference with respect to a remaining portion of the reflected light from the beam splitter, and a second detector configured to detect a hologram image of interference light of the SIG on a pupil plane, wherein the object is measured based on reflectance information.

According to another aspect of an example embodiment, there is provided a pupil ellipsometry measurement method including acquiring a hologram image of an object to be measured by a pupil ellipsometry measurement apparatus, reconstructing reflectance information based on the hologram image, and measuring the object based on the reflectance information, wherein the acquiring of the hologram image includes producing interference light through self-interference of reflected light from the object by a self-interference generator (SIG) included in the pupil ellipsometry measurement apparatus, and detecting the hologram image of the interference light on a pupil plane by a first detector included in the pupil ellipsometry measurement apparatus.

According to another aspect of an example embodiment, there is provided a method of fabricating a semiconductor device, the method including preparing the semiconductor device to be measured, acquiring a hologram image of the semiconductor device by a pupil ellipsometry measurement apparatus, reconstructing reflectance information based on the hologram image, measuring the semiconductor device based on the reflectance information, determining whether the semiconductor device is normal based on a result of the measuring, and performing a subsequent process on the semiconductor device based on the semiconductor device being determined to be normal, wherein the acquiring of the hologram image includes producing interference light through self-interference of reflected light from the semiconductor device by a self-interference generator (SIG) included in the pupil ellipsometry measurement apparatus, and detecting the hologram image of the interference light on a pupil plane by a first detector included in the pupil ellipsometry measurement apparatus.

BRIEF DESCRIPTION OF THE DRAWINGS

Example embodiments will be more clearly understood from the following detailed description taken in conjunction with the accompanying drawings in which.

DETAILED DESCRIPTION

Figure 1:
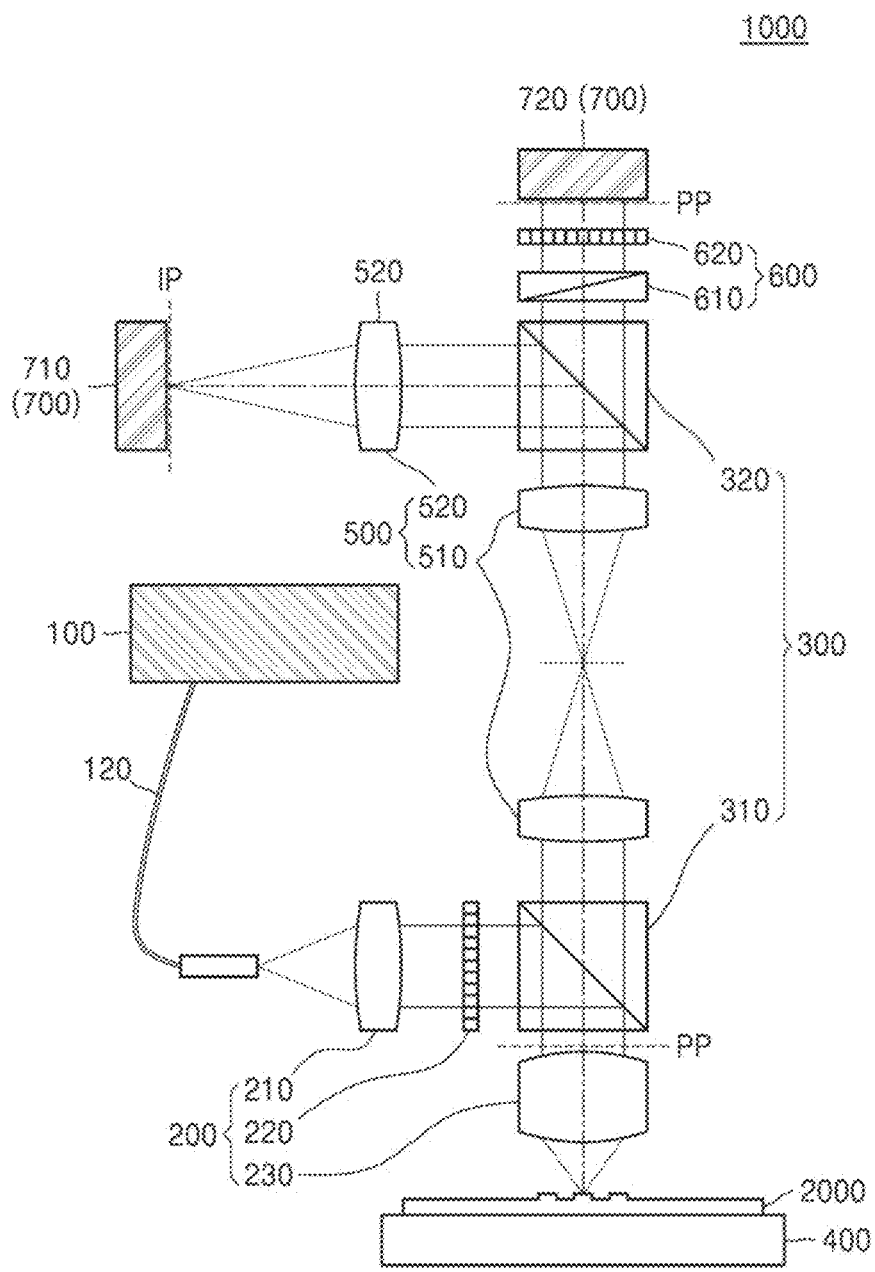
FIG. 1 is a schematic structural diagram of a pupil ellipsometry measurement apparatus according to an example embodiment.

Hereinafter, example embodiments will be described in detail with reference to the accompanying drawing. In the drawing, like reference characters denote like elements, and redundant descriptions thereof will be omitted.

FIG. 1 is a schematic structural diagram of a pupil ellipsometry measurement apparatus according to an example embodiment.

Referring to FIG. 1, a pupil ellipsometry measurement apparatus (hereinafter, also referred to as a measurement apparatus) 1000 may include a light source unit 100, an irradiation optical system 200, a beam splitter unit 300, a stage 400, a relay optical system 500, a self-interference generator (SIG) 600, and a detector unit 700.

The light source unit 100 may generate and input light of a certain wavelength to the irradiation optical system 200. The light source unit 100 may generate and output coherent light. The coherent light may cause interference, such as constructive interference or destructive interference, because of a phase difference when at least two beams overlap with each other. For example, the light source unit 100 may include a light source and a monochromator. The light source may generate and output broadband light. The monochromator may convert the broadband light into monochromatic light and output the monochromatic light. The light source unit 100 may operate such that the monochromator converts broadband light from the light source into monochromatic light of a certain wavelength and outputs the monochromatic light. According to an example embodiment, the light source unit 100 may include a plurality of point sources outputting monochromatic light.

The irradiation optical system 200 may radiate light, which is incident from the light source unit 100 through an optical fiber 120, to an object 2000 to be measured using optical elements. In the measurement apparatus 1000 according to the example embodiment, the irradiation optical system 200 may include a collimator 210, a first polarizer 220, and an objective lens 230. The collimator 210 may convert incident monochromatic light output from the monochromator into parallel light. The first polarizer 220 may polarize the light from the collimator 210. For example, polarization may include linear polarization. The linear polarization may be converting incident light into linearly polarized light by passing only a p-polarization component (a horizontal component) or an s-polarization component (a vertical component). However, embodiments are not limited thereto. According to other example embodiments, the first polarizer 220 may perform circular polarization or elliptical polarization.

The objective lens 230 may focus light from a first beam splitter 310 on the object 2000 to be measured. An incident angle (θ) of the light focused by the objective lens 230 may depend on a numerical aperture (NA) of the objective lens 230. For example, when the refractive index of air is 1, a relationship NA=sin θ may be established. Accordingly, the closer the NA is to 1, the closer the incident angle is to 90°. Due to this focusing operation of the objective lens 230, light components incident through different positions in the objective lens 230 may have different incident angles and azimuthal angles. In the measurement apparatus 1000 according to the example embodiment, a second detector 720 may detect an image on a pupil plane PP (a pupil image) with respect to the object 2000 to be measured. Pixels of the pupil image may respectively correspond to different positions in the objective lens 230, and thus include reflectance information of light components, which are incident through the different positions in the objective lens 230 and have different incident angles and azimuthal angles. The concept of acquiring all reflectance information of light components having various incident angles and azimuthal angles based on the objective lens 230 and a pupil image will be described in detail with reference to FIGS. 4A and 4B below.

Light reflected from the object 2000 to be measured may be incident to the first beam splitter 310 through the objective lens 230. According to an example embodiment, the first beam splitter 310 may be included in the irradiation optical system 200. According to an example embodiment, the irradiation optical system 200 may further include at least one optical element.

The beam splitter unit 300 may include the first beam splitter 310 and a second beam splitter 320. The first beam splitter 310 may direct light polarized by the first polarizer 220 toward the objective lens 230 and direct light, which is reflected from the object 2000 to be measured and incident through the objective lens 230, toward the second beam splitter 320. The second beam splitter 320 may direct a portion of light from the first beam splitter 310 toward a first detector 710 and direct the remaining portion of the light toward the SIG 600.

The stage 400 may support and fix the object 2000 to be measured. For example, the object 2000 to be measured may be positioned on a top surface of the stage 400, and the stage 400 may support and fix a bottom surface of the object 2000 to be measured. The stage 400 may move in three dimensions by, for example, a motor. As the stage 400 moves, the object 2000 to be measured may also move. For example, focusing of the object 2000 on the z-axis and/or a movement of the object 2000 on an x-y plane may be performed by moving the stage 400. Here, the z-axis may correspond to a normal line perpendicular to the top surface of the stage 400 or the object 2000, and the x-y plane may correspond to the top surface of the stage 400 or the object 2000 or a plane perpendicular to the z-axis.

The object 2000 to be measured may include a mask or a wafer, each including a pattern. The object 2000 to be measured may include a semiconductor device including a multi-patterning layer or an overlay mark. The measurement apparatus 1000 may measure and analyze various properties of the object 2000. For example, when light polarized by the first polarizer 220 is reflected from the object 2000, the polarization state of the light may be changed according to the state of the object 2000. Accordingly, the measurement apparatus 1000 may measure and analyze various properties, e.g., an overlay error, a pattern size, a pattern thickness, and a pattern uniformity, of the object 2000 by detecting light reflected from the object 2000 and analyzing the polarization state of the light. According to an example embodiment, the measurement apparatus 1000 may detect a defect such as, for example, a bad pattern or a foreign body of the object 2000.

The measurement and analysis of the object 2000 may be performed by at least one processor by comparing reflectance information, which is acquired through the second detector 720 and holographic reconstruction, with reference information stored in a database. According to an example embodiment, the measurement and analysis of the object 2000 may be performed through machine learning based on a reflectance information of a plurality of objects 2000, which is acquired by the measurement apparatus 1000.

The components of the at least one processor may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, communication between the components may be performed through a bus. Functional aspects of the above example embodiments may be implemented in algorithms that execute on one or more processors. Furthermore, the components may employ any number of related art techniques for electronics configuration, signal processing and/or control, data processing and the like.

The relay optical system 500 may relay light from the objective lens 230 to the first detector 710 and the SIG 600. For example, the relay optical system 500 may include a relay lens 510 and an imaging lens 520. The relay lens 510 may include a pair of lenses and may relay light from the first beam splitter 310 to the second beam splitter 320. The imaging lens 520 may focus light from the second beam splitter 320 on the first detector 710. The imaging lens 520 may include a tube lens. According to an example embodiment, the second beam splitter 320 may be included in the relay optical system 500. According to an example embodiment, the relay optical system 500 may further include at least one optical element in addition to the relay lens 510 and the imaging lens 520.

The SIG 600 may generate interference light or interference signal from light, which is incident through the second beam splitter 320, using self-interference. At this time, the light incident to the SIG 600 through the second beam splitter 320 may correspond to reflected light, which is obtained when polarized light of the first polarizer 220 is reflected from the object 2000 and relayed by optical elements between the object 2000 and the SIG 600. As described above, the polarization state of the polarized light of the first polarizer 220 may be changed when reflected from the object 2000, and accordingly, various properties of the object 2000 may be measured by detecting the reflected light and analyzing the polarization state of the reflected light.

The SIG 600 may include a polarizing prism 610 and a second polarizer 620 to generate interference light through self-interference. The polarizing prism 610 may split incident light into beams having different polarization states. For example, the polarizing prism 610 may split incident light into a vertically polarized beam and a horizontally polarized beam. In the measurement apparatus 1000, the polarizing prism 610 may include, for example, a Nomarski prism, a Wollaston prism, or a Rochon prism. Light splitting by the Nomarski prism, the Wollaston prism, or the Rochon prism will be described in detail with reference to FIGS. 2A through 2C below.

The second polarizer 620 may enable two polarized beams from the polarizing prism 610 to have a common polarization component. For example, the second polarizer 620 may pass only an intermediate polarization component, e.g., a 45°-polarization component, of vertical polarization and horizontal polarization. Accordingly, a common polarization component corresponding to a 45°-polarization component of a vertically polarized beam and a horizontally polarized beam from the polarizing prism 610 may be passed by the second polarizer 620. In addition, two beams passing through the second polarizer 620 may produce interference light on the pupil plane PP through self-interference.

The detector unit 700 may include the first detector 710 and the second detector 720. The first detector 710 may detect an image of reflected light, which is formed on an imaging plane IP through the imaging lens 520. The first detector 710 may include a two-dimensional (2D) array detector such as a charge-coupled device (CCD) camera. However, the first detector 710 is not limited to a CCD camera. The first detector 710 may be arranged on the imaging plane IP and may be used to identify a measurement position of the object 2000 and an optimal focal position in an optical axis direction.

The second detector 720 may detect an image of interference light, which is generated by the SIG 600 through self-interference, for example, a hologram image, on the pupil plane PP. In general, when light is detected on the pupil plane PP, the intensity of the light may be more accurately measured. Accordingly, the second detector 720 may accurately measure the intensity of the hologram image. The second detector 720 may include a CCD camera or a photo-multiplier tube (PMT). However, the second detector 720 is not limited to those above. A pupil plane PP above the objective lens 230 may be a back focal plane. The pupil plane PP below the second detector 720 may correspond to an exit pupil plane.

A hologram image may be formed using the principle of holography. The principle of holography is described below. Light from a light source is split into two beams: one beam is reflected from a reference mirror and radiated to a screen, and the other beam is reflected from an object to be measured and radiated to the screen. At this time, the beam reflected from the reference mirror may be a reference beam, and the beam reflected from the object may be an object beam. Because the object beam has been reflected from the surface of the object, the phase of the object beam varies with a position in the surface of the object. Therefore, the reference beam and the object beam may interfere with each other, and accordingly, an interference pattern may be formed on the screen. The image of this interference pattern may be a hologram image. While an ordinary image includes information about only the intensity of light, a hologram image may include information about both the intensity and the phase of light.

The measurement apparatus 1000 may detect a hologram image through self-interference using the SIG 600 instead of interference between a reference beam and an object beam using a reference mirror. Accordingly, the structure of the measurement apparatus 1000 may be simplified. In addition, the measurement apparatus 1000 may accurately measure the intensity of a hologram image by detecting the hologram image in the pupil plane PP using the second detector 720. Therefore, reflectance information corresponding to the polarization properties of interference light may be accurately calculated through a subsequent holographic reconstruction process. Furthermore, the measurement apparatus 1000 may acquire reflectance information corresponding to all azimuthal angles and all incident angles in a single shot by using the objective lens 230 and a pupil image corresponding to the objective lens 230. Therefore, the object 2000 may be quickly and accurately measured without adjusting the incident angle and azimuthal angle of light incident to the object 2000. In addition, a cross-correlation problem in which similar spectrums appear with respect to different parameter changes in a certain structure may be resolved. The cross-correlation problem will be described in detail with reference to FIGS. 5A and 5B below.

Reflectance information may include information about the polarization properties of light and may be expressed as psi ($\Psi$) and delta ($\Delta$). At this time, W indicates an intensity ratio of two interfering beams of interference light, and $\Delta$ indicates a phase difference between two interfering beams. The reflectance information may be expressed as alpha ($\alpha$) and beta ($\beta$) which are ellipsometric constants. Relationships among $\Psi$, $\Delta$, $\alpha$, and $\beta$ may be defined as Equations (1) and (2) below:

$$\tan \Psi = \{(1+\alpha)/(1-\alpha)\}^{1/2}, \text{ and} \qquad \text{Equation (1)}$$

$$\cos \Delta = \beta/(1-\alpha^2)^{1/2}. \qquad \text{Equation (2)}$$

$\Psi$ and $\Delta$ will be explained in detail in the description of a holographic reconstruction process with reference to FIGS. 7A through 7D.

In the related art, a measurement apparatus may use a method of directly measuring the polarization properties of light reflected from the object 2000, apart from an interference method by which a hologram image is generated using a reference mirror. However, when the direct measurement method is used, a compensator may be further required, and the rotation of a polarizer and the compensator may also be required. In addition, because an incident angle is fixed to one or several, it is more difficult to accurately measure an object. Contrarily, the measurement apparatus 1000 according to the example embodiment may more quickly and accurately measure the object 2000 at one time in a single measurement by using the objective lens 230, a pupil image corresponding to the objective lens 230, and holographic reconstruction. Therefore, the problems of the measurement apparatus according to the related art may be resolved.

Figure 2A:
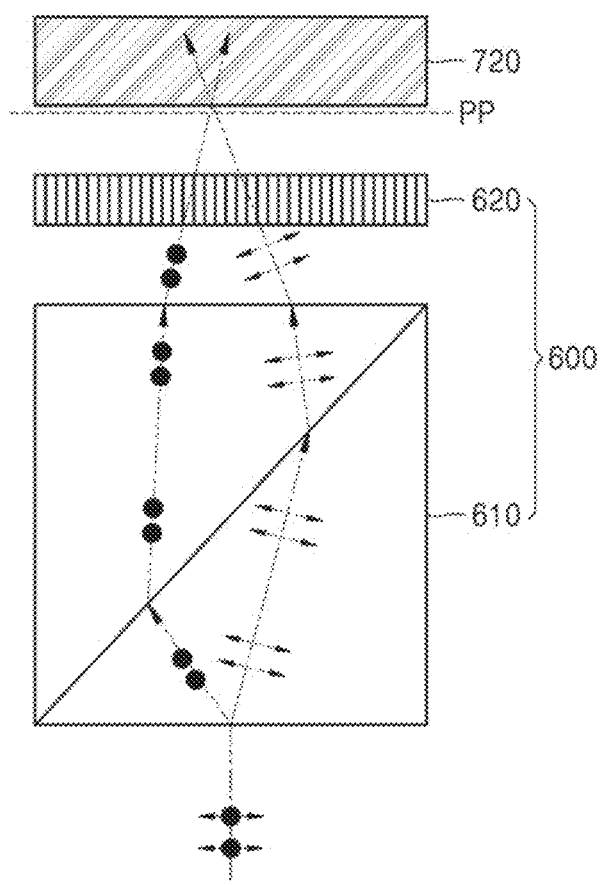
FIGS. 2A, 2B, and 2C are detailed structural diagrams of self-interference generators (SIGs) of the pupil ellipsometry measurement apparatus of FIG. 1.
Figure 2B:
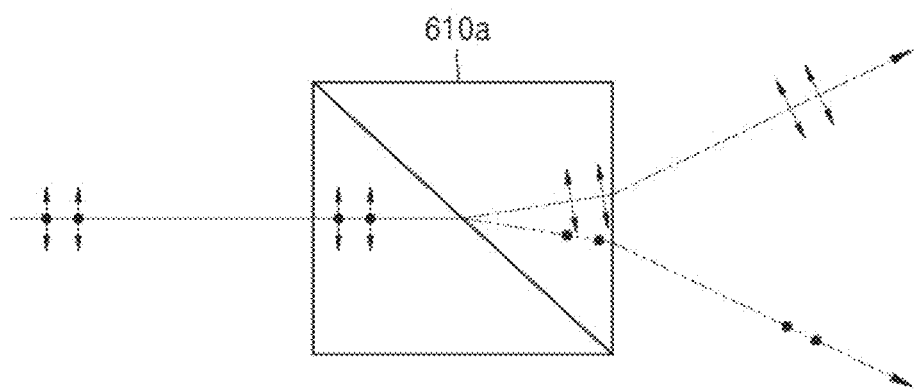
Figure 2C:
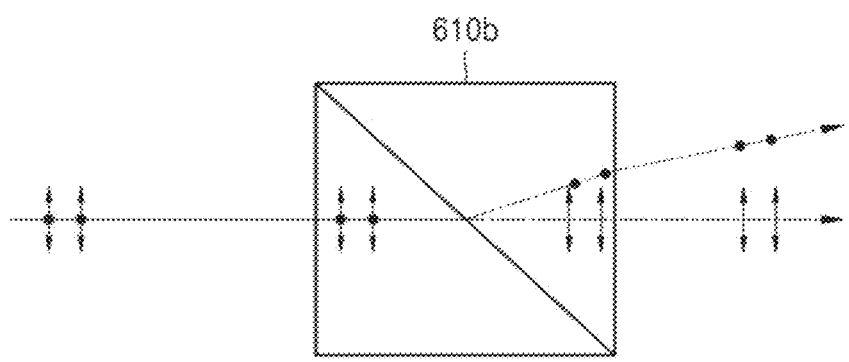

FIGS. 2A through 2C are detailed structural diagrams of SIG 600 of the measurement apparatus 1000 of FIG. 1. The SIG in FIG. 2A includes a Nomarski prism, the SIG of FIG. 2B includes a Wollaston prism, and the SIG of FIG. 2C includes a Rochon prism. Other optical elements than a polarizing prism are omitted from the SIGs of FIGS. 2B and 2C. FIG. 1 will also be referred to in the description below.

Referring to FIG. 2A, light incident to the polarizing prism 610 of the Nomarski prism may be split into a first polarized beam represented by black dots and a second polarized beam represented by bidirectional arrows. The first and second polarized beams may be refracted at boundary surfaces and output at angles such that the first and second polarized beams become closer to each other. At this time, the first and second polarized beams may have different polarization states. According to an example embodiment, the first polarized beam may include an ordinary ray, and the second polarized beam may include an extraordinary ray. The first and second polarized beams passing through the polarizing prism 610 may be changed by the second polarizer 620 to have the same polarization component and may then interfere with each other and perform self-interference on the pupil plane PP, thereby producing interference light.

Referring to FIGS. 2B and 2C, in the examples of a polarizing prism 610a of the Wollaston prism and a polarizing prism 610b of the Rochon prism, incident light is split into a first polarized beam and a second polarized beam, and the first and second polarized beams are refracted at boundary surfaces and output at angles such that the first and second polarized beams become farther apart from each other. Therefore, when an SIG includes a Wollaston prism or a Rochon prism, at least one mirror may be required to change the angle of a beam such that two beams meet and interfere with each other. The second polarizer 620 may also be required to enable two beams to have the same polarization component.

Figure 3A:
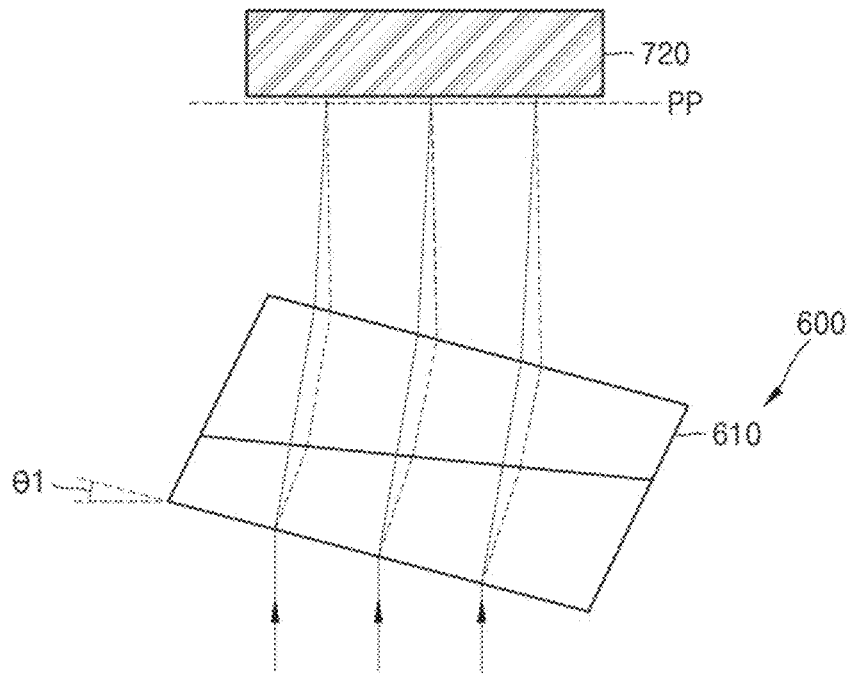
FIGS. 3A and 3B are structural diagrams showing different arrangements of the SIG of the pupil ellipsometry measurement apparatus of FIG. 1.
Figure 3B:
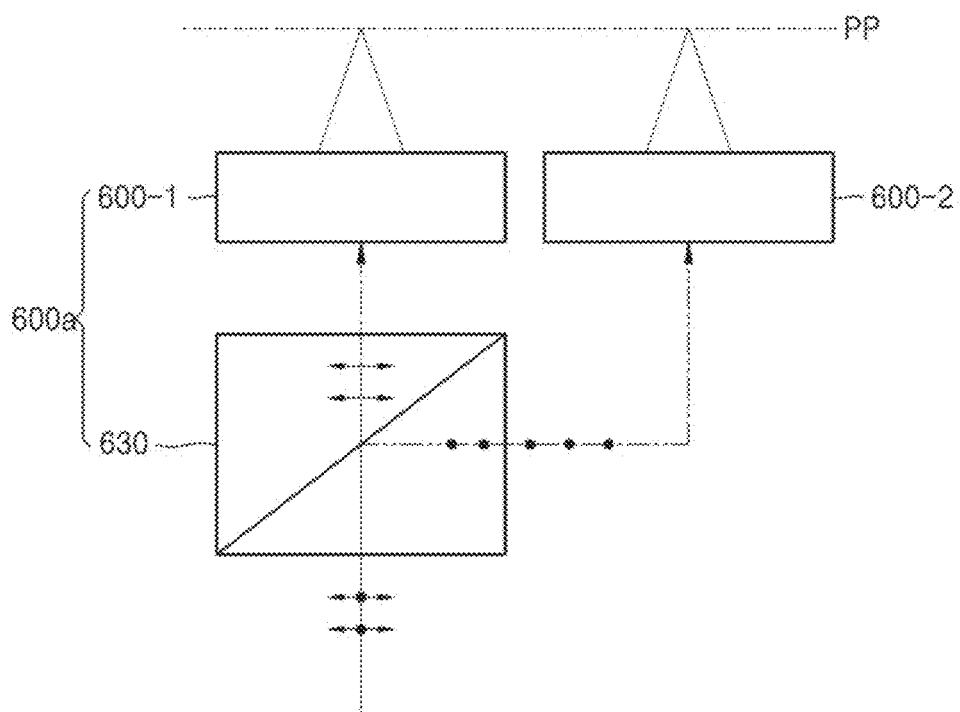

FIGS. 3A and 3B are structural diagrams showing different arrangements of a SIG of the measurement apparatus 1000 of FIG. 1. A second polarizer is omitted from FIG. 3A. A polarizing prism and a second polarizer are simplified into rectangular blocks in FIG. 3B. FIG. 1 is also referred to in the description below.

Referring to FIG. 3A, in the measurement apparatus 1000, not a single beam but a plurality of beams corresponding to the entire area of the objective lens 230 may pass through the SIG 600. The beams may be detected on the pupil plane PP by the second detector 720 as a hologram image. When the polarizing prism 610 is parallel with the pupil plane PP as shown in FIG. 2A, beams incident to different positions in the polarizing prism 610 may interfere with each other at different positions, and accordingly, a pupil plane may tilt. Tilting of the pupil plane PP may be prevented by arranging the polarizing prism 610 to have a first angle θ1 with respect to the pupil plane PP, as shown in FIG. 3A. For example, all beams incident to different positions in the polarizing prism 610 may be allowed to perform self-interference on the pupil plane PP, which is horizontal, by arranging the polarizing prism 610 with a tilt. According to an example embodiment, the second detector 720 may be tilted and the polarizing prism 610 may not be tilted.

Referring to FIG. 3B, a SIG 600a of the measurement apparatus 1000 may include a first SIG 600-1, a second SIG 600-2, and a polarizing beam splitter 630. Each of the first SIG 600-1 and the second SIG 600-2 may correspond to the SIG 600 in FIG. 2A or 3A. However, embodiments are not limited thereto. For example, each of the first SIG 600-1 and the second SIG 600-2 may include a Wollaston prism or a Rochon prism.

Similarly to a Wollaston prism or a Rochon prism, the polarizing beam splitter 630 may split incident light into a first polarized beam and a second polarized beam. However, the polarizing beam splitter 630 may split incident light into two polarized beams by way of transmitting a portion of the incident light and reflecting the other portion of the incident light. Each of the two polarized beams may be incident to the first SIG 600-1 or the second SIG 600-2 and may produce interference light on the pupil plane PP. Light reflected from the object 2000 is split into two beams by the polarizing beam splitter 630, and interference light is produced with respect to each of the two beams, and accordingly, polarization properties, i.e., reflectance information, may be more accurately acquired. The beam traveling to the right of the polarizing beam splitter 630 may be directed to the second SIG 600-2 by a mirror.

Figure 4A:
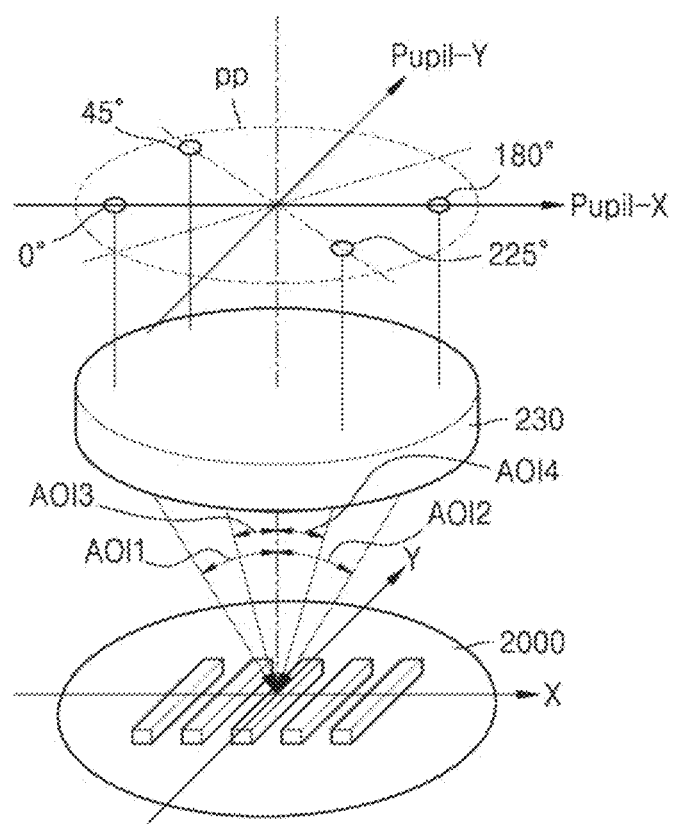
FIGS. 4A and 4B are respectively a structural diagram and a pupil image, which are provided to describe that the pupil ellipsometry measurement apparatus of FIG. 1 may acquire reflectance information with respect to various incident angles and azimuthal angles.
Figure 4B:
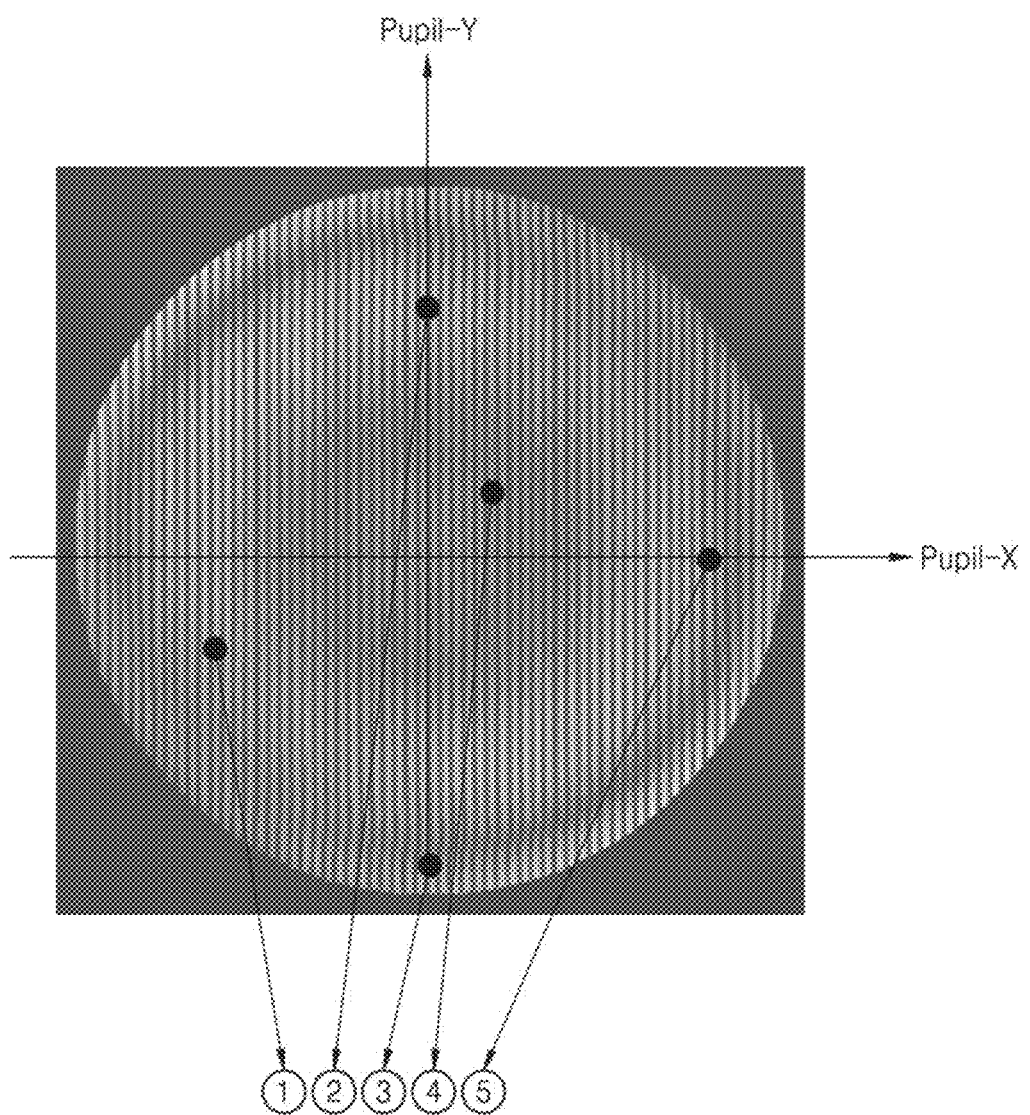

FIGS. 4A and 4B are respectively a structural diagram and a pupil image, which are provided to describe that the measurement apparatus 1000 of FIG. 1 may acquire reflectance information with respect to various incident angles and azimuthal angles. FIG. 1 will also be referred to in the description below.

Referring to FIGS. 4A and 4B, light is focused by the objective lens 230 on a micro portion of the object 2000, and the light incident to the object 2000 is reflected from the object 2000 and output to the objective lens 230 according to Snell's law. For example, referring to FIG. 4A, incident light having a first incident angle AOI1 may be reflected at a reflection angle corresponding to a second incident angle AOI2. According to another example, incident light having the second incident angle AOI2 may be reflected at a reflection angle corresponding to the first incident angle AOI1. The first incident angle AOI1 and a corresponding reflection angle, i.e., the second incident angle AOI2, may have an azimuthal angle difference of 180° therebetween. For example, when the first incident angle AOI1 has an azimuthal angle of 0°, the second incident angle AOI2 corresponding to the reflection angle may have an azimuthal angle of 180°. For example, when incident light having a third incident angle AOI3 is reflected at a reflection angle corresponding to a fourth incident angle AOI4 and the third incident angle AOI3 has an azimuthal angle of 45°, the fourth incident angle AOI4 corresponding to the reflection angle may have an azimuthal angle of 225°. In FIG. 4A, incident angles of light are shown below the objective lens 230, and azimuthal angles respectively corresponding to the incident angles are shown on the pupil plane PP above the objective lens 230.

FIG. 4B shows a hologram image detected on the pupil plane PP. As described above, each pixel of the hologram image may include reflectance information (e.g., W and A) with respect to a different incident angle and a different azimuthal angle. For example, when the hologram image is divided into four quadrants by an x-axis Pupil-X and a y-axis Pupil-Y, the first quadrant may correspond to azimuthal angles between 90° and 180°, the second quadrant may correspond to azimuthal angles between 0° and 90°, the third quadrant may correspond to azimuthal angles between 270° and 360°, and the fourth quadrant may correspond to azimuthal angles between 180° and 270°. The closer a position to the center of the four quadrants, the closer an incident angle to 0°. The further the position away from the center of the four quadrants, the closer an incident angle to 90°. For example, a dot $\dot{2}$ may correspond to an azimuthal angle of 90° and an incident angle of about 40°, a dot $\dot{3}$ may correspond to an azimuthal angle of 270° and an incident angle of about 60°, and a dot $\dot{5}$ may correspond to an azimuthal angle of 180° and an incident angle of about 50°. A dot $\dot{1}$ may correspond to an azimuthal angle of 337° and an incident angle of about 40°, and a dot $\dot{4}$ may correspond to an azimuthal angle of 135° and an incident angle of about 15°. Consequently, all pixels of the hologram image may include reflectance information corresponding to all azimuthal angles and incident angles of light incident to the object 2000. However, a maximum incident angle may be determined according to the NA of the objective lens 230, as described above. For example, when the NA of the objective lens 230 is about 0.9, an incident angle may have a range from about 0° to about 64°.

Figure 5A:
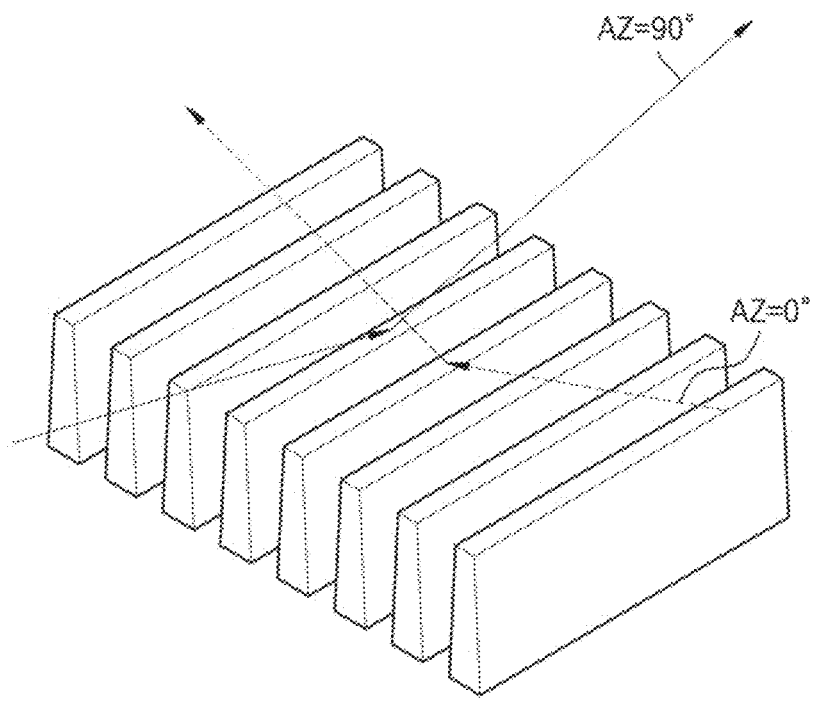
FIGS. 5A and 5B are respectively a structural diagram and a graph, which show that the sensitivity of measurement may vary with an incident angle and an azimuthal angle.
Figure 5B:
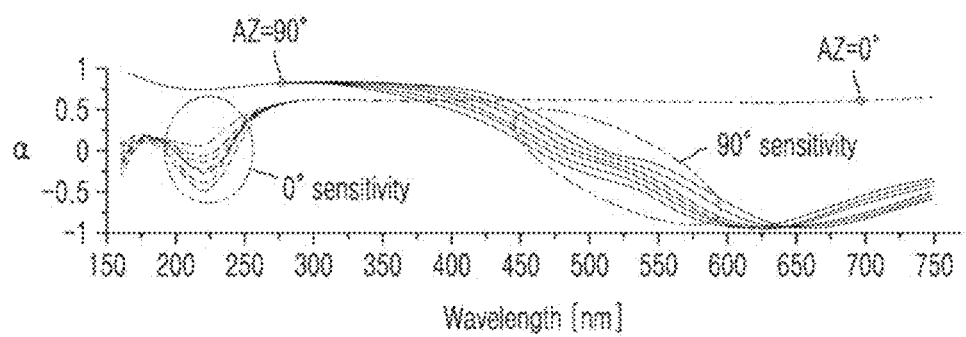

FIGS. 5A and 5B are respectively a structural diagram and a graph, which show that the sensitivity of measurement may vary with an incident angle and an azimuthal angle. In FIG. 5B, the x-axis is the wavelength of light in units of nm, and the y-axis is the ellipsometric constant α without units. FIG. 1 will also be referred to in the description below.

Referring to FIGS. 5A and 5B, the object 2000 to be measured has a lattice pattern, e.g., a line-and-space pattern, and light, which is marked with the solid line and has an azimuthal angle AZ of 90° parallel with an extension direction of a line, and light, which is marked with the dashed line and has an azimuthal angle AZ of 0° perpendicular to the extension direction of the line, are used, as shown in FIG. 5A.

FIG. 5B shows the sensitivity with respect to incident angles at each of two azimuthal angles when a is measured with respect to a wavelength while an incident angle is changed at the two azimuthal angles. In detail, in the case of the azimuthal angle AZ of 90°, a curves at different incident angles are nearly the same as and are not distinguished from one another at a short wavelength, e.g., a wavelength of 300 nm or less, but are different and distinguished from one another at a long wavelength corresponding to a visible ray. In the case of the azimuthal angle AZ of 0°, a curves at different incident angles are different and distinguished from one another at a short wavelength, but are nearly the same as and are not distinguished from one another at a long wavelength. Consequently, as marked with a long-and-two-short dashed line oval, in the case of the azimuthal angle AZ of 90°, the sensitivity with respect to an incident angle is high in a long-wavelength range, e.g., a wavelength range of about 450 nm to about 600 nm, and in the case of the azimuthal angle AZ of 0°, the sensitivity with respect to an incident angle is high in a short-wavelength range, e.g., a wavelength range of about 200 nm to about 250 nm.

Sensitivity with respect to changes in an azimuthal angle, an incident angle, and a wavelength may vary with a pattern on the object 2000. Accordingly, to accurately measure the object 2000, an image corresponding to a wavelength needs to be acquired while changing an azimuthal angle and an incident angle. However, a measurement apparatus according to the related art performs measurement at a fixed azimuthal angle and one or several incident angles and may thus not accurately perform measurement with respect to various patterns of the object 2000. Contrarily, according to the example embodiment, the measurement apparatus 1000 may acquire reflectance information corresponding to all incident angles and all azimuthal angles by using the objective lens 230 and a pupil image corresponding to the objective lens 230, i.e., a hologram image on the pupil plane PP, and may thus perform more accurate measurement with respect to various patterns of the object 2000.

A problem in that similar spectrums appear with respect to different parameter changes in a certain structure is referred to as a cross-correlation problem. For example, there is a portion, in which a curves are the same with respect to a wavelength in spite of a change in an incident angle, depending on an azimuthal angle in FIG. 5B. This portion may have the cross-correlation problem. For example, there may be various cross-correlation problems such as a case in that changes in the depth and the width of an object change spectrums identically and a case in that spectrums are nearly the same because a volume of an object is similar though a pattern of the object is different. These cross-correlation problems may be caused by performing measurement at a fixed incident angle and/or a fixed azimuthal angle. However, according to the present embodiment, the measurement apparatus 1000 may acquire reflectance information corresponding to all incident angles and all azimuthal angles and thus more efficiently resolve the cross-correlation problems described above.

Figure 6A:
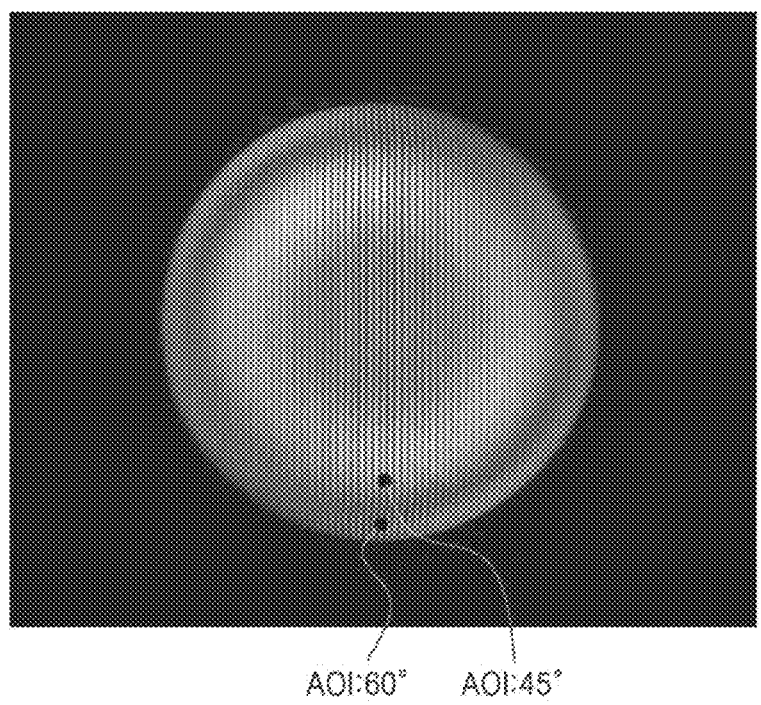
FIGS. 6A, 6B, and 6C are a pupil image, which shows the measurement consistency of the pupil ellipsometry measurement apparatus of FIG. 1, and graphs of psi (Ψ) versus wavelength.
Figure 6B:
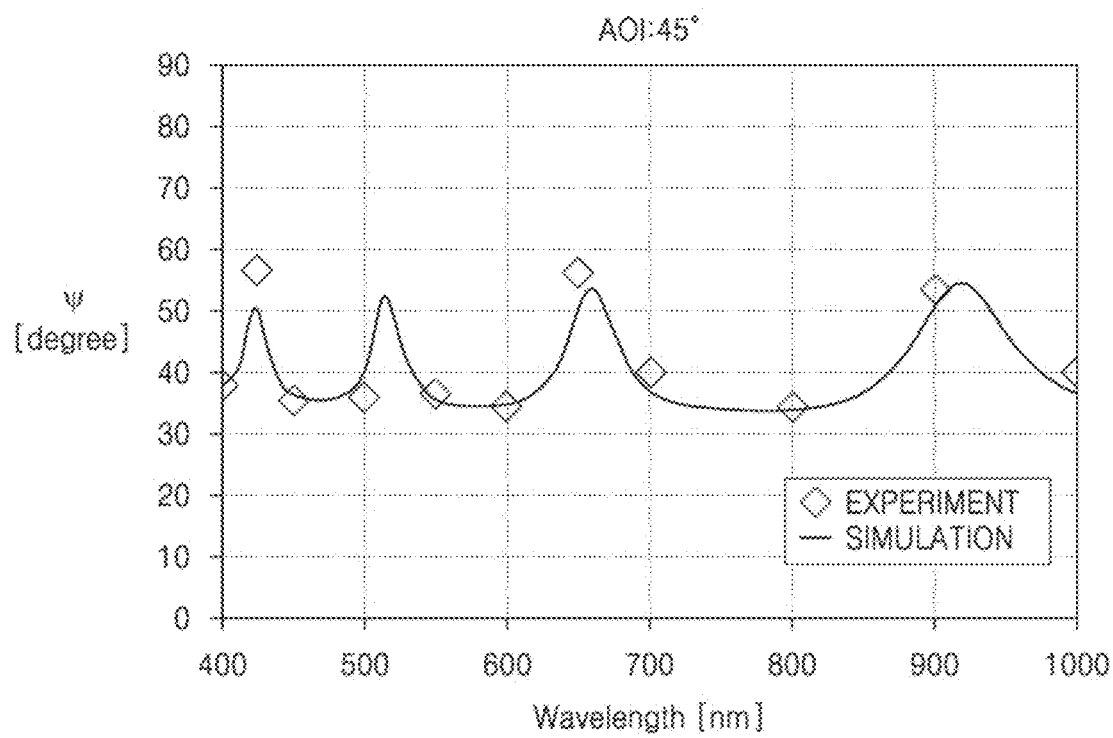
Figure 6C:
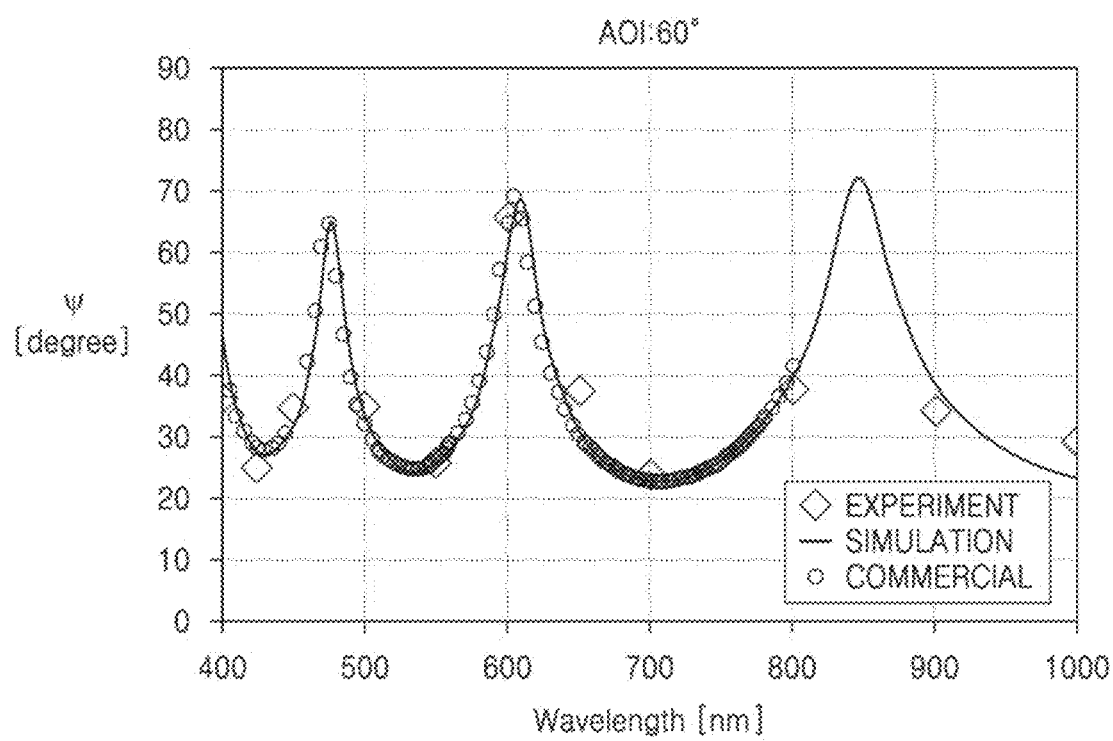

FIGS. 6A through 6C are a pupil image, which shows the measurement consistency of the measurement apparatus 1000 of FIG. 1, and graphs of $\Psi$ versus a wavelength. FIG. 6A shows a pupil image (a hologram image), detected through an experiment. FIG. 6B shows $\Psi$ versus wavelength, which are acquired with respect to a portion corresponding to an incident angle AOI of 45° through an experiment and a simulation. FIG. 6C shows $\Psi$ versus wavelength, which are acquired with respect to a portion corresponding to an incident angle AOI of 60° through an experiment, a simulation, and commercial equipment. FIG. 1 will also be referred to in the description below.

Referring to FIGS. 6A through 6C, two black dots in the hologram image of FIG. 6A may respectively correspond to the incident angle AOI of 45° and the incident angle AOI of 60°. The two black dots may both correspond to an azimuthal angle of, for example, 270°. FIG. 6B shows that W versus wavelength with respect to the incident angle AOI of 45° is substantially the same between the experiment and the simulation. Accordingly, it may be confirmed that the measurement consistency of the measurement apparatus 1000 is very high. FIG. 6C shows that $\Psi$ versus wavelength with respect to the incident angle AOI of 60° is substantially the same among the experiment, the simulation, and the commercial equipment. Accordingly, it may also be confirmed that the measurement consistency of the measurement apparatus 1000 is very high. In FIG. 6C, COMMERCIAL may refer to a commercial ellipsometry measurement apparatus.

FIGS. 7A through 7D are simulation images showing a holographic reconstruction method performed by the measurement apparatus 1000 of FIG. 1. FIG. 1 will also be referred to in the description below.

Figure 7A:
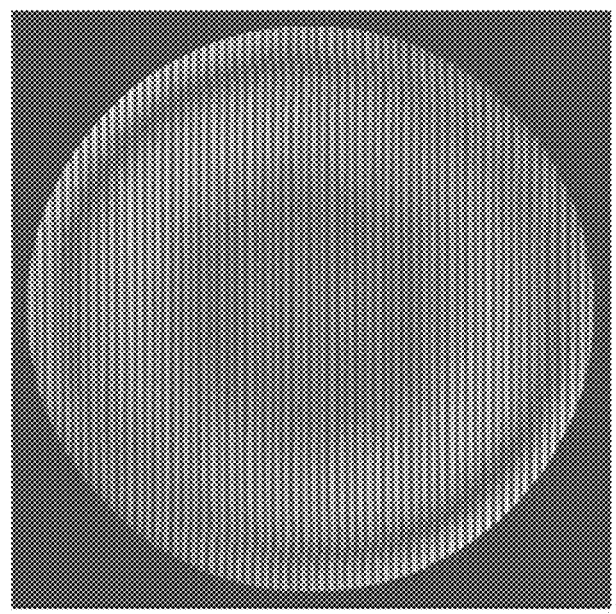
FIGS. 7A, 7B, 7C, and 7D are simulation images showing a holographic reconstruction method performed by the pupil ellipsometry measurement apparatus of FIG. 1.

Referring to FIGS. 7A through 7D, the second detector 720 of the measurement apparatus 1000 detects a pupil image (a hologram image) on the pupil plane PP. The hologram image may include an interference pattern having a line-and-space shape, as shown in FIG. 7A. The hologram image is not limited to the line-and-space shape. For example, the hologram image may have various shapes according to the shape of a pattern on the object 2000. The hologram image may correspond to representation of the intensity of light in time domain on a 2D plane.

Figure 7B:
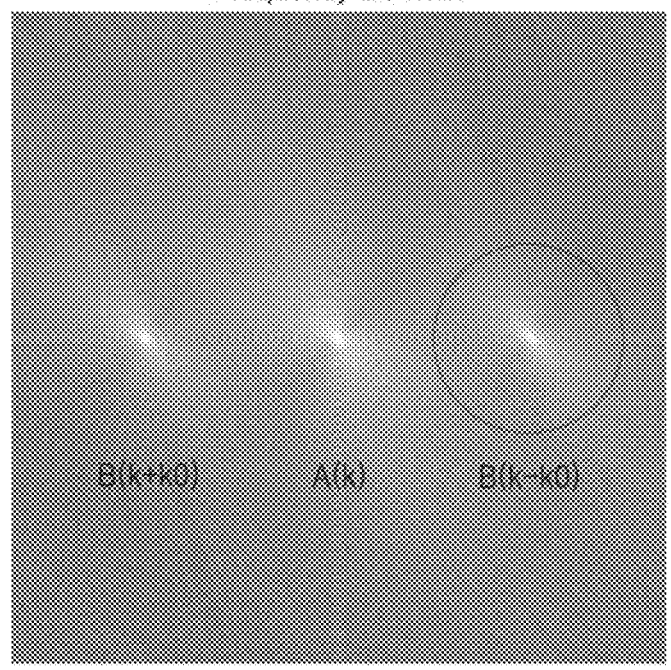

Subsequently, a Fourier transform is performed for the hologram image of FIG. 7A. More particularly, a signal in the frequency domain is acquired by performing a Fourier transform for a signal corresponding to the hologram image of FIG. 7A. According to an example embodiment, a Fourier transform and a Hilbert transform may be performed in combination for the hologram image. FIG. 7B shows the magnitudes of the signal in the frequency domain on a 2D plane. Peak portions are shown in FIG. 7B. A peak portion denoted by A(k) at the center may correspond to a non-interference component of an interference signal, and peak portions denoted by $B(k+k_0)$ and $B(k-k_0)$ at opposite outer sides may correspond to interference components of the interference signal.

In detail, two signals are respectively expressed as $E_1 = |E_1(x)|e^{-ik0x}$ and $E_2 = |E_2(x)|e^{i\varphi(x)}$. Here, k0 is a spatial frequency difference between the two signals, and $\varphi(x)$ is a phase difference between the two signals.

An interference signal of the two signals may be expressed as $E_1+E_2$, and an intensity I of the interference signal may be expressed as Equation (3) below:

$$I = |E_1 + E_2|^2 \hspace{3em} \text{Equation (3)}$$
$$= |E_1(x)|^2 + |E_2(x)|^2 + E_1^* E_2 e^{i\varphi(x)} e^{ik0x} + E_1 E_2^* e^{-i\varphi(x)} e^{-ik0x}.$$

When a Fourier transform is performed for the intensity I, it may be expressed as Equation (4) below:

$$FT\{I\}(k) = A(k) + B(k-k0) + B^*(k+k0) \hspace{2em} \text{Equation (4)}$$

Here, A(k) is $FT\{|E_1(x)|^2 + |E_2(x)|^2\}$ and may correspond to a non-interference component of the interference signal, and B(k) is $FT\{E_1^* E_2 e^{i\varphi(x)}\}$ and may correspond to an interference component of the interference signal.

Reflectance information $\Psi$ and $\Delta$ corresponding to polarization properties may be calculated by Equations (5) and (6):

$$\Psi = |A/2B| \pm (|A/2B|^2 - 1)^{1/2} \hspace{2em} \text{Equation (5)}$$

$$\Delta = \angle \text{Eret}. \hspace{2em} \text{Equation (6)}$$

Here, Eret refers to performing an inverse Fourier transform for B(k) and may be expressed in a complex signal, as shown in Equation (7):

$$\text{Eret} = FT^{-1}\{B(k)\}(x) = E_1 * E_{2e}^{i\varphi(x)}. \hspace{2em} \text{Equation (7)}$$

A may be calculated by taking an argument from the complex signal Eret, and may eventually correspond to the phase difference $\varphi(x)$ between the two signals.

Accordingly, B(k) needs to be extracted first to calculate $\Delta$. B(k) may be extracted through the procedure described below.

First, one component is selected from two interference components. For example, as marked with the solid circle in FIG. 7B, the right peak B(k−k0) may be selected. Such process of finding a peak signal of an interference component may be peak finding. Alternatively, B(k+k0) may be selected as a peak signal of an interference component.

Figure 7C:
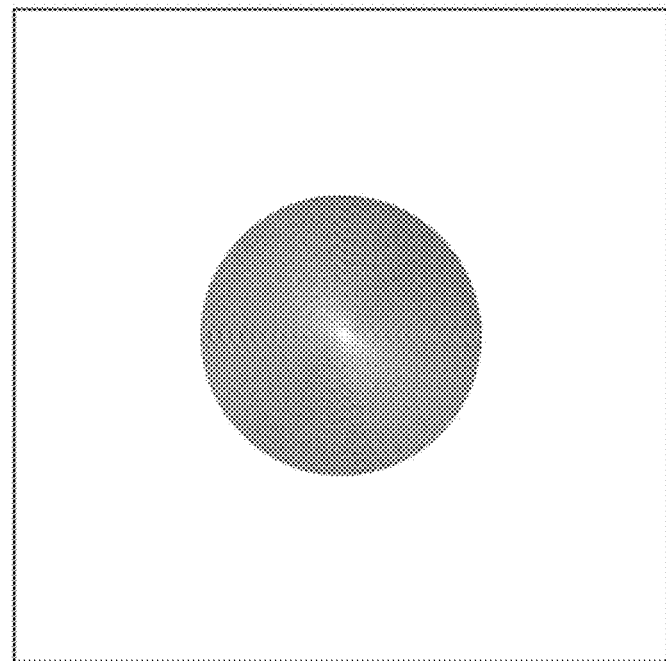

Thereafter, only the peak signal B(k−k0) may be extracted from an entire signal. The peak signal B(k−k0) may be extracted using a high-pass filter (HPF). The process of extracting the peak signal B(k−k0) may be digital masking. After the peak signal B(k−k0) is extracted, the peak signal B(k) may be extracted by moving the peak signal B(k−k0) to the center. The process of moving the peak signal B(k−k0) to the center may be mask centering. FIG. 7C shows an image resulting when the peak signal B(k−k0) is changed into the peak signal B(k) through digital masking and mask centering such that a peak signal corresponding to an interference component is at the center.

Figure 7D:
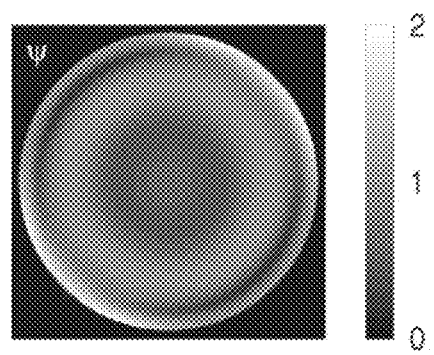
Figure 7D:
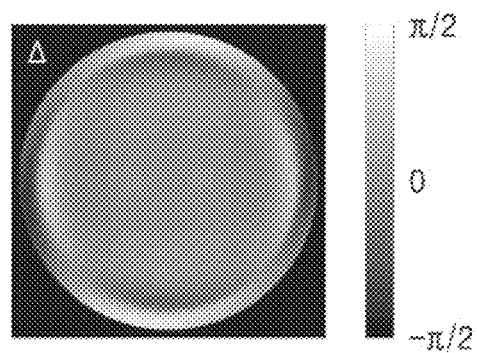

Thereafter, Eret may be acquired by performing an inverse Fourier transform for B(k), and A may be calculated by taking an argument from Eret. Ψ may be calculated using the absolute values of A(k) and B(k) according to Equation (5). FIG. 7D shows an image of W and an image of Δ, which are calculated through the procedure described above.

Figure 8A:
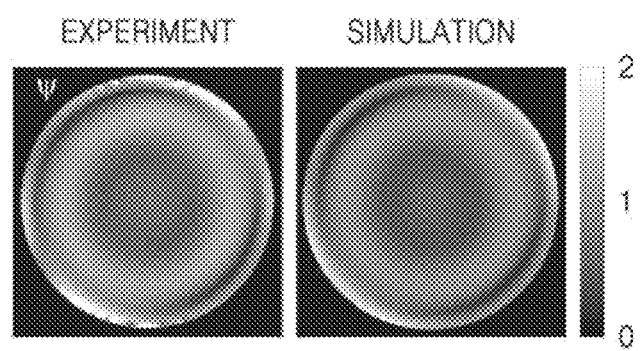
FIGS. 8A and 8B show images corresponding to a psi (Ψ) acquired through an experiment and a simulation and a graph of Ψ versus incident angle.
Figure 8B:
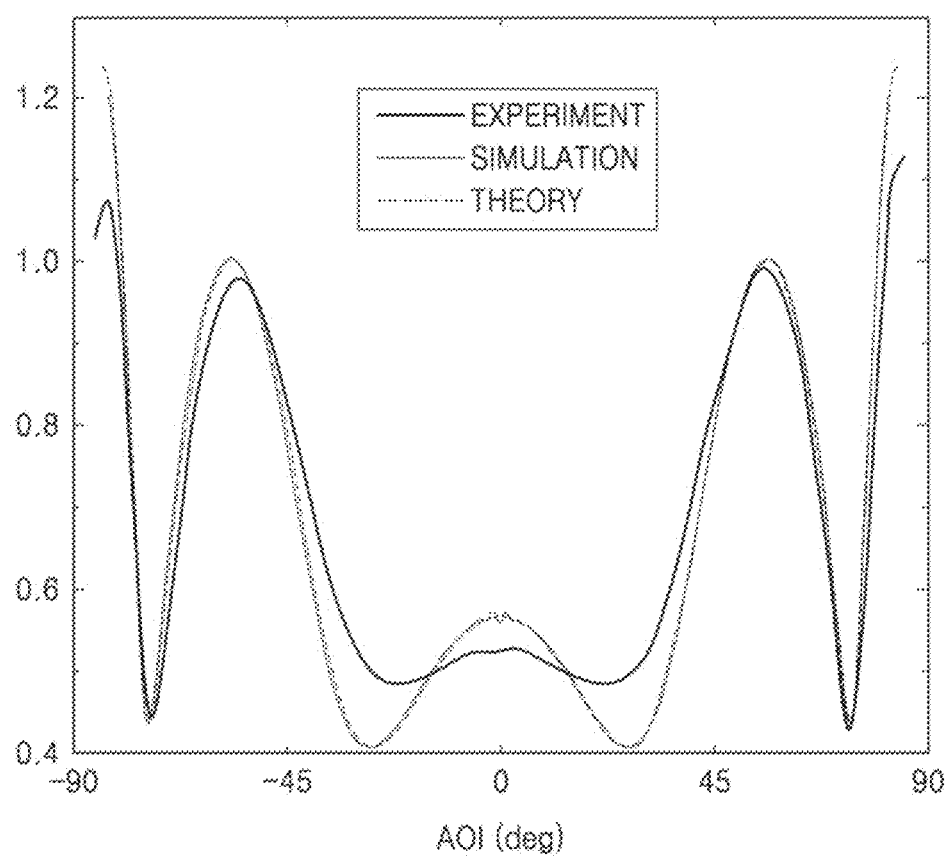

FIGS. 8A and 8B show images corresponding to Ψ acquired through an experiment and a simulation and a graph of Ψ versus incident angle. The graph of FIG. 8B shows Ψ versus incident angle AOI, which is acquired through an experiment, a simulation, and theory.

FIG. 8A shows that the image of Ψ in the experiment is nearly identical to the image of W in the simulation. FIG. 8B shows that Ψ versus incident angle AOI is substantially identical among the experiment, the simulation, and the theory. Accordingly, it may be confirmed that the measurement consistency of the measurement apparatus 1000 is very high. In FIG. 8B, the graph corresponding to the experiment is obtained by measuring the object 2000 using the measurement apparatus 1000 of FIG. 1 and calculating Ψ through the above-described holographic reconstruction, the graph corresponding to the simulation is obtained by simulating the measurement by the measurement apparatus 1000 through an appropriate algorithm and performing a corresponding simulation calculation, and the graph corresponding to the theory is obtained through calculation based on, for example, Fresnel reflection theory.

Figure 9A:
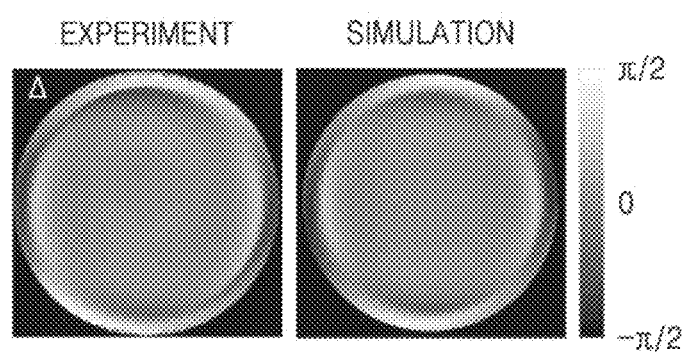
FIGS. 9A and 9B show images corresponding to a delta (Δ) acquired through an experiment and a simulation and a graph of Δ versus incident angle.
Figure 9B:
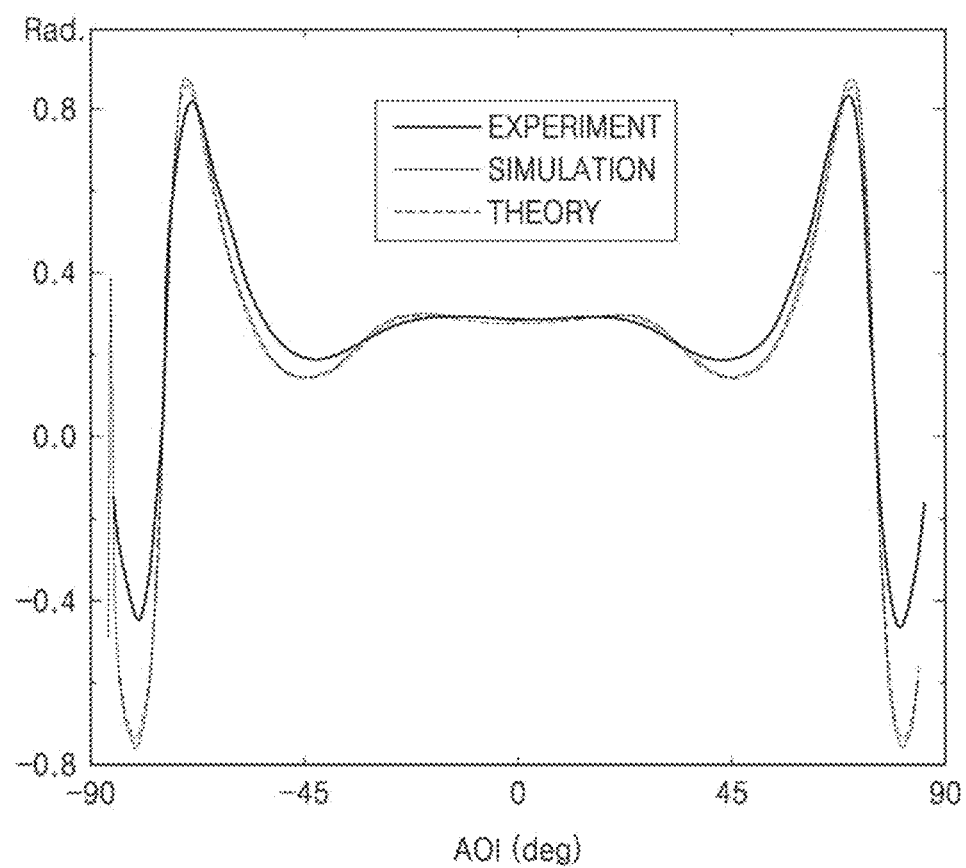

FIGS. 9A and 9B show images corresponding to Δ acquired through an experiment and a simulation and a graph of Δ versus incident angle. The graph of FIG. 9B shows A versus incident angle AOI, which is acquired through an experiment, a simulation, and theory, and the unit of the y-axis is radians (Rad.).

FIG. 9A shows that the image of A in the experiment is nearly identical to the image of Δ in the simulation. FIG. 9B shows that Δ versus incident angle AOI is similar among the experiment, the simulation, and the theory. Accordingly, it may be confirmed that the measurement consistency of the measurement apparatus 1000 is very high. The graphs of the experiment, the simulation, and the theory in FIG. 9B are the same as those described with reference to FIG. 8B.

Figure 10:
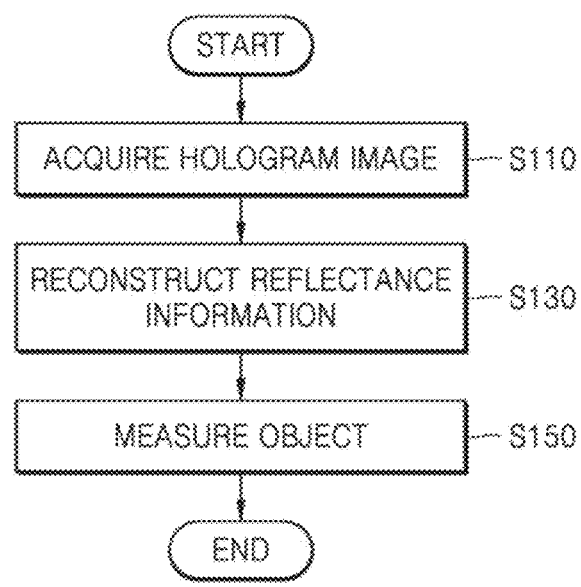
FIG. 10 is a schematic flowchart of a pupil ellipsometry measurement method according to an example embodiment.

FIG. 10 is a schematic flowchart of a pupil ellipsometry measurement method according to an example embodiment. FIG. 1 will also be referred to in the description below, and redundant descriptions that have been made with reference to FIG. 1 are briefly given or omitted.

Referring to FIG. 10, the pupil ellipsometry measurement method (hereinafter, also referred to as a measurement method) according to the example embodiment includes acquiring a hologram image using the measurement apparatus 1000 of FIG. 1 in operation S110. For example, the second detector 720 of the measurement apparatus 1000 detects the hologram image on the pupil plane PP based on the objective lens 230 and the SIG 600. Operation S110 of acquiring the hologram image will be described in detail with reference to FIG. 11A below.

Subsequently, reflectance information is reconstructed based on the hologram image in operation S130. For example, the reflectance information, e.g., Ψ and Δ, may be calculated by performing a Fourier transform, peak finding, digital masking, mask centering, and an inverse Fourier transform, as described above with reference to FIGS. 7A through 7D. Operation S130 of reconstructing the reflectance information will be described in detail with reference to FIG. 11B below.

Thereafter, the object 2000 is measured based on the reflectance information in operation S150. At this time, the measurement may be analyzing and identifying various properties of the object 2000. For example, various properties, such as an overlay error and the size, the thickness, and the uniformity of a pattern, of the object 2000 may be identified and analyzed based on the reflectance information.

The measurement method may more accurately acquire the intensity of a hologram image by detecting the hologram image on the pupil plane PP based on self-interference, and thus more accurately calculate the reflectance information through holographic reconstruction. Furthermore, the measurement method may acquire reflectance information corresponding to all azimuthal angles and all incident angles at one time in a single measurement using the objective lens 230 and a pupil image corresponding to the objective lens 230, thereby quickly and accurately measuring the object 2000 without adjusting an incident angle and an azimuthal angle and resolving cross-relation problems.

Figure 11A:
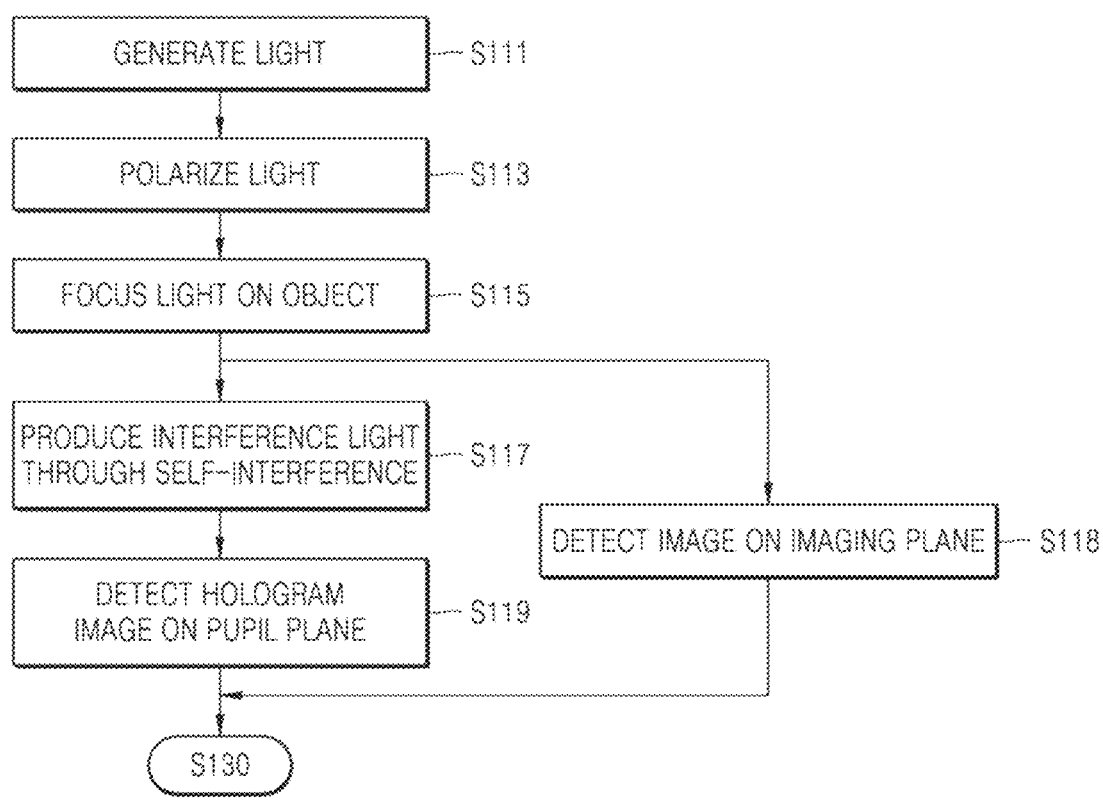
FIGS. 11A and 11B are respectively detailed flowcharts of an operation of acquiring a hologram image and an operation of reconstructing reflectance information in FIG. 10.
Figure 11B:
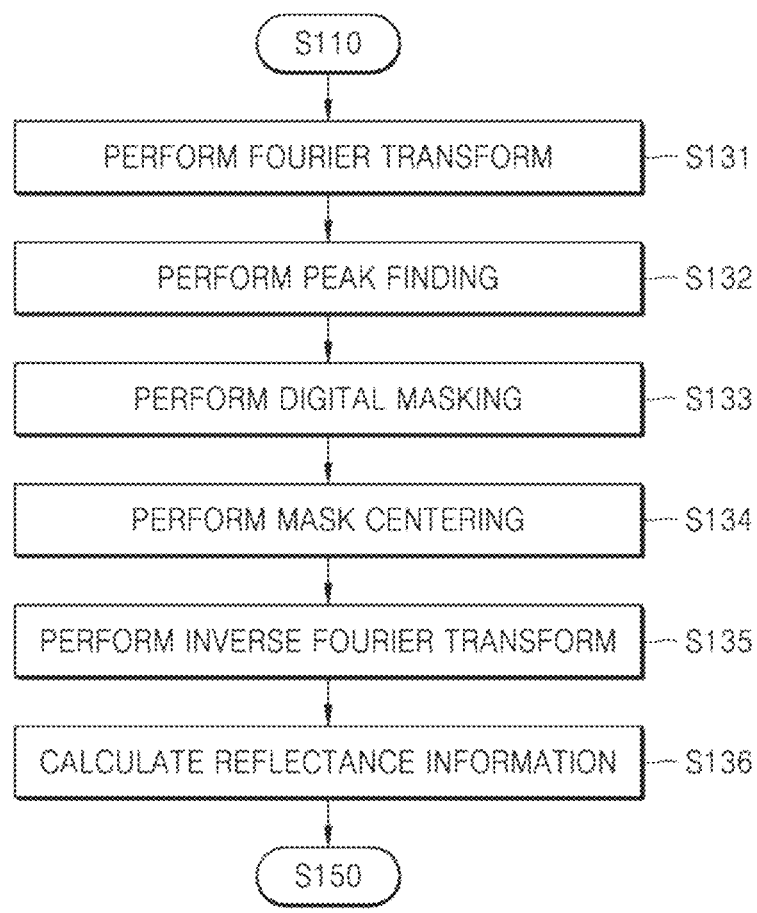

FIGS. 11A and 11B are respectively detailed flowcharts of an operation of acquiring a hologram image and an operation of reconstructing reflectance information in FIG. 10. FIG. 1 will also be referred to in the description below, and redundant descriptions that have been made with reference to FIGS. 1 and 10 are briefly given or omitted.

Referring to FIG. 11A, operation S110 of acquiring the hologram image in the measurement method includes generating and outputting light using the light source unit 100 of the measurement apparatus 1000 in operation S111. For example, the light source unit 100 may include a broadband light source and a monochromator. Accordingly, the broadband light source may generate broadband light, and the monochromator may convert the broadband light into certain monochromatic light and output the monochromatic light.

Subsequently, light is polarized using the first polarizer 220 of the irradiation optical system 200 in operation S113. For example, the polarization of the first polarizer 220 may include linear polarization. However, the polarization of the first polarizer 220 is not limited to linear polarization.

Thereafter, the polarized light is focused on the object 2000 by the objective lens 230 of the irradiation optical system 200 in operation S115. The maximum incident angle of light incident to the object 2000 may be determined by the NA of the objective lens 230. Due to the focusing operation of the objective lens 230, all pixels of a pupil image, which correspond to all positions in the objective lens 230, may include reflectance information corresponding to all incident angles and all azimuthal angles.

The SIG 600 of the measurement apparatus 1000 produces interference light with respect to reflected light from the object 2000 through self-interference in operation S117. The self-interference may occur when the reflected light is split by the polarizing prism 610 into two polarized beams having different polarization, and the two polarized beams are changed by the second polarizer 620 to have a common polarization component and then combine on the pupil plane PP. Through this self-interference, the interference light may be produced on the pupil plane PP.

Thereafter, the second detector 720 of the measurement apparatus 1000 detects the hologram image on the pupil plane PP in operation S119. Meanwhile, the first detector 710 of the measurement apparatus 1000 detects an image on the imaging plane IP with respect to the reflected light from the object 2000 in operation S118. As described above, the reflected light from the object 2000 may be transmitted to the second beam splitter 320 through the objective lens 230, the first beam splitter 310, and the relay lens 510. A portion of the reflected light may be directed by the second beam splitter 320 to the SIG 600, and the other portion of the reflected light may be directed by the second beam splitter 320 to the imaging lens 520. Light that has passed through the SIG 600 may be detected as the hologram image on the pupil plane PP by the second detector 720. Light that has passed through the imaging lens 520 may be detected as an ordinary image on the imaging plane IP by the first detector 710.

Referring to FIG. 11B, operation S130 of reconstructing the reflectance information in the measurement method includes performing a Fourier transform for the hologram image detected by the second detector 720 of the measurement apparatus 1000 in operation S131. For example, a signal in the frequency domain is acquired by performing a Fourier transform for a signal corresponding to the hologram image. According to an example embodiment, a Fourier transform and a Hilbert transform may be performed in combination for the hologram image.

Subsequently, peak finding is performed in the signal in the frequency domain in operation S132. The peak finding may be a process of finding and selecting a peak signal corresponding to an interference component in the signal in the frequency domain. There may be two peak signals corresponding to the interference component, and one may be selected from the two peak signals.

Thereafter, digital masking is performed in operation S133, and mask centering is performed in operation S134. The digital masking may be a process of extracting the selected peak signal and may be performed by applying, for example, an HPF to the signal in the frequency domain in operation S133. The mask centering may be a process of moving the extracted peak signal to a central portion in operation S134.

After the mask centering is performed in operation S134, an inverse Fourier transform is performed for the peak signal in operation S135. Thereafter, the reflectance information is calculated based on an inverse Fourier transformed signal in operation S136. The reflectance information, e.g., W and A, may be calculated using Equations (5) and (6).

Figure 12:
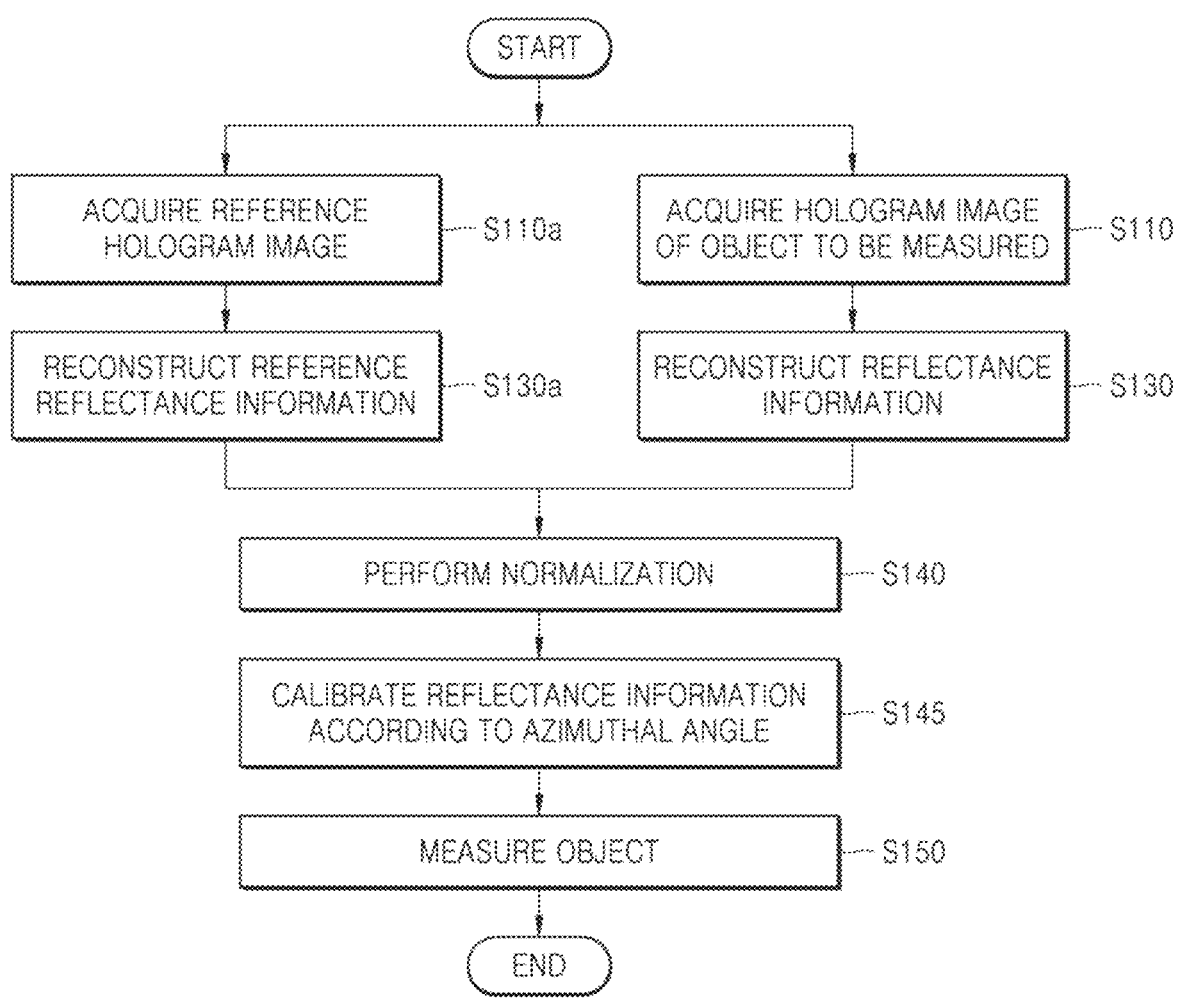
FIG. 12 is a schematic flowchart of a pupil ellipsometry measurement method according to an example embodiment.

FIG. 12 is a schematic flowchart of a measurement method according to an example embodiment. FIG. 1 will also be referred to in the description below, and redundant descriptions that have been made with reference to FIGS. 10 through 11B are briefly given or omitted.

Referring to FIG. 12, the measurement method includes acquiring a hologram image with respect to the object 2000 using the measurement apparatus 1000 of FIG. 1 in operation S110. Continuously, reflectance information is reconstructed based on the hologram image in operation S130. Operation S110 of acquiring the hologram image and operation S130 of reconstructing the reflectance information are respectively the same as operations S110 and S130 in FIG. 10 and have thus been described above with reference to FIGS. 11A and 11B.

Subsequently, a reference hologram image is acquired with respect to a reference sample using the measurement apparatus 1000 of FIG. 1 in operation S110a, and reference reflectance information is reconstructed based on the reference hologram image in operation S130a. At this time, the reference sample may include, for example, a bare wafer which has no pattern and no defect. Operation S110a of acquiring the reference hologram image and operation S130a of reconstructing the reference reflectance information may be substantially the same as operation S110 of acquiring the hologram image and operation S130 of reconstructing the reflectance information, except that the reference sample instead of the object 2000 to be measured is used.

As shown in FIG. 12, the order of operations S110 and S130 for the object 2000 and operations S110a and S130a for the reference sample may be arbitrary. For example, operations S110 and S130 for the object 2000 may be performed before operations S110a and S130a for the reference sample, or operations S110a and S130a for the reference sample may be performed before operations S110 and S130 for the object 2000. When there are a plurality of measurement apparatuses 1000, operations S110 and S130 for the object 2000 and operations S110a and S130a for the reference sample may be simultaneously performed.

Thereafter, the reflectance information of the object 2000 is normalized using the reference reflectance information in operation S140. The normalization may be performed by dividing the reflectance information of the object 2000 by the reference reflectance information. For example, when the reflectance information of the object 2000 is Ψ and Δ and the reference reflectance information is Ψr and Δr, normalized reflectance information may be expressed as Ψn=Ψ/Ψr and Δn=Δ−Δr. According to an example embodiment, before reflectance information of an object to be measured and reflectance information of a reference sample are calculated, a normalized complex signal may be obtained by dividing a complex signal of the object by a complex signal of the reference sample. Normalized reflectance information may be calculated from the normalized complex signal. Such normalize reflectance information or such normalized complex signal may be used as, for example, unique fingerprint data for the object 2000.

Subsequently, reflectance information according to an azimuthal angle is calibrated in operation S145. In general, because the magnitude of a polarization component changes according to an azimuthal angle, the magnitude of the polarization component may be calibrated based on a single reference azimuthal angle, e.g., an azimuthal angle of 0°. Thereafter, the reflectance information may be calibrated based on the calibrated polarization component. At this time, the reflectance information may refer to the normalized reflectance information.

When a change in a polarization component according to an azimuthal angle is calculated based on a fixed azimuthal angle of a measurement apparatus according to the related art, the calibrated reflectance information may be substantially the same as reflectance information acquired by the measurement apparatus according to the related art. Accordingly, the reflectance information calibrated according to the azimuthal angle may be used for comparison with the reflectance information acquired by the measurement apparatus according to the related art and used to determine the measurement consistency of the measurement apparatus 1000. According to an embodiment, operation S145 may be omitted.

Thereafter, the object 2000 is measured based on the calibrated reflectance information in operation S150.

Figure 13A:
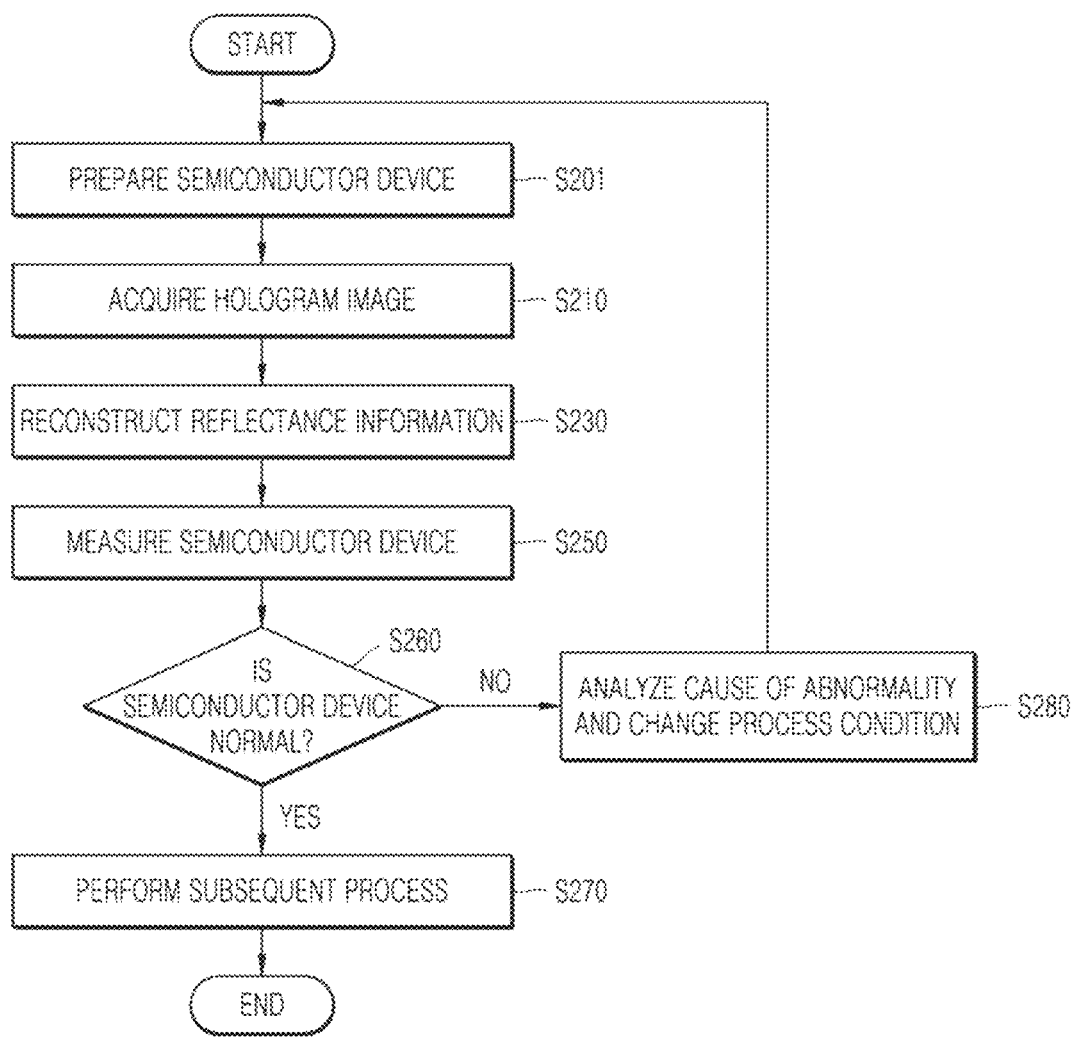
FIGS. 13A and 13B are respectively schematic flowcharts of methods of fabricating a semiconductor device using a pupil ellipsometry measurement method according to example embodiments.
Figure 13B:
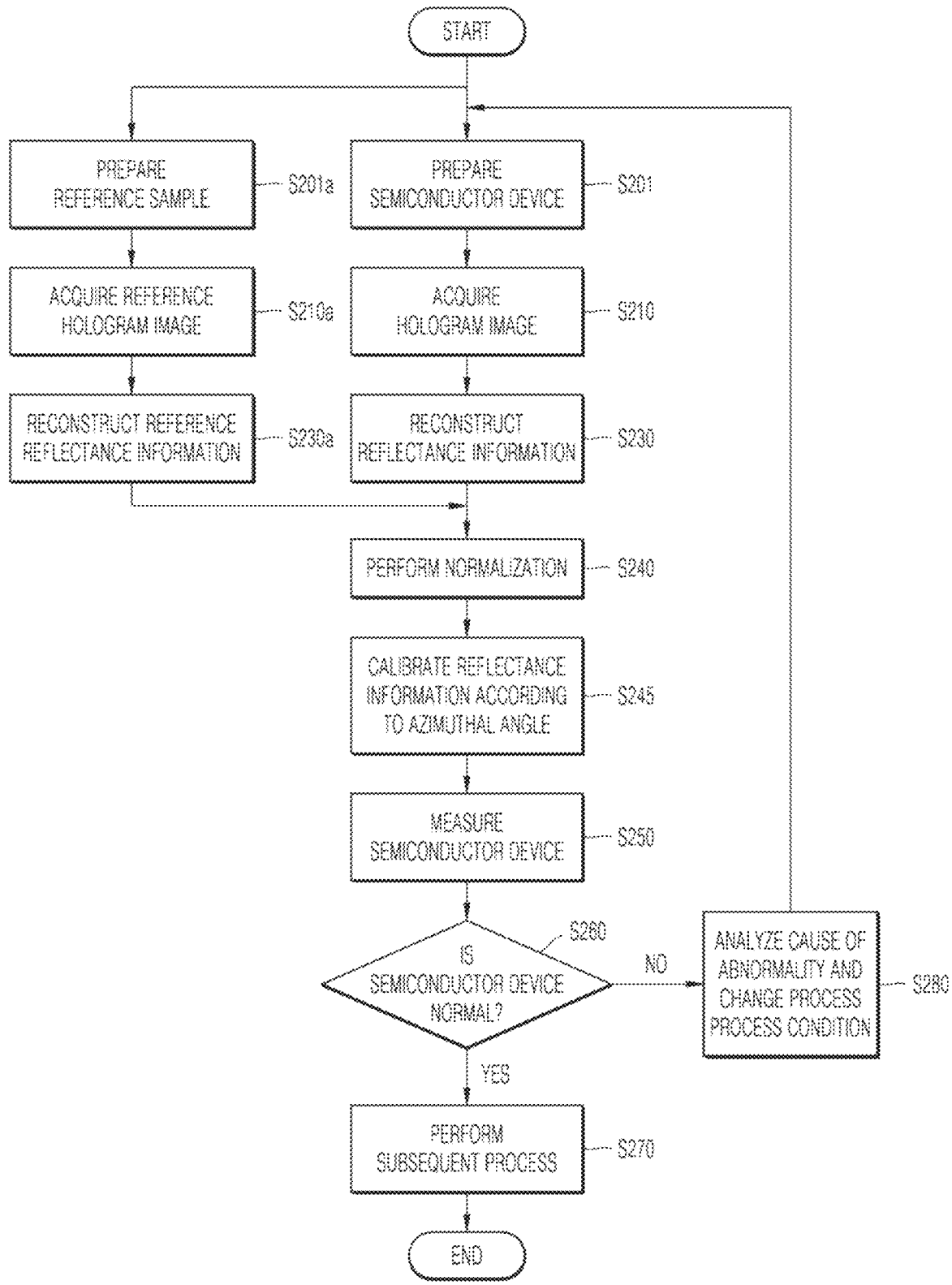

FIGS. 13A and 13B are schematic flowcharts of methods of fabricating a semiconductor device using a pupil ellipsometry measurement method according to example embodiments. FIG. 1 will also be referred to in the description below, and redundant descriptions that have been made with reference to FIGS. 10 through 12 are briefly given or omitted.

Referring to FIG. 13A, the method of fabricating a semiconductor device using a pupil ellipsometry measurement method (hereinafter, also referred to as a fabrication method) includes preparing a semiconductor device corresponding to an object to be measured in operation S5201. For example, the semiconductor device may include a mask, a wafer, or a portion corresponding to a shot or a chip in a wafer. The semiconductor device is not limited to those above. The preparing of the semiconductor device may include manufacturing the semiconductor device.

After the semiconductor device is prepared, operations S210 through S250 are sequentially performed. Operation S210 of acquiring a hologram image, operation S230 of reconstructing reflectance information, and operation S250 of measuring the semiconductor device may respectively correspond to operation S110 of acquiring a hologram image, operation S130 of reconstructing reflectance information, and operation S150 of measuring an object in FIG. 10.

Thereafter, whether the semiconductor device is normal is determined based on a measurement result in operation S260. When the semiconductor device is normal (in case of YES), a subsequent process is performed on the semiconductor device in operation S270. For example, the subsequent process may include vapor deposition, etching, an ion process, and cleaning. The subsequent process may also include a process of testing the semiconductor device at a wafer level. Furthermore, the subsequent process may include a process of singulating a wafer into semiconductor chips and a process of packaging the semiconductor chips.

When the semiconductor device is abnormal (in case of NO), the cause of abnormality is analyzed and an involved process condition is changed in operation S280. At this time, the process condition may include conditions for semiconductor processes of manufacturing a semiconductor device. For example, when the cause of abnormality is a focus error in a lithography process, a focus position may be changed. When the cause of abnormality is a dose error in the lithography process, a dose may be changed. Thereafter, the method proceeds to operation S201. The semiconductor device that has undergone the changed process condition may be prepared in operation S201.

Referring to FIG. 13B, operations S201 through S230 are sequentially performed, and operations S201a through S230a may be sequentially performed. Operation S201 through S230 in FIG. 13B may respectively correspond to operations S201 through S230 in FIG. 13A. A reference sample is prepared in operation S201a. At this time, a sample such as a bare wafer that may be used as a reference is prepared. Operation S210a of acquiring a reference hologram image and operation S230a of reconstructing reference reflectance information may respectively correspond to operations S110a and S130a in FIG. 12.

Thereafter, operations S240 through S250 are sequentially performed. Operation S240 of performing normalization, operation S245 of calibrating the reflectance information, and operation S250 of measuring the semiconductor device may respectively correspond to operations S140, S145, and S150 in FIG. 12, except that the object to be measured is the semiconductor device.

After the semiconductor device is measured, whether the semiconductor device is normal is determined in operation S260, a subsequent process is performed in operation S270, and the cause of abnormality is analyzed and a process condition is changed in operation S280. Operations S260 through S280 have been described with reference to FIG. 13A.

While example embodiments have been described with reference to the figures, it will be apparent to one of ordinary skill in the art that various changes in form and details may be made in these examples without departing from the spirit and scope of the claims and their equivalents.

What is claimed is:

1. A method of fabricating a semiconductor device, the method comprising:
   preparing the semiconductor device to be measured;
   acquiring a hologram image of the semiconductor device by a pupil ellipsometry measurement apparatus;
   reconstructing reflectance information based on the hologram image;
   measuring the semiconductor device based on the reflectance information;
   determining whether the semiconductor device is normal based on a result of the measuring; and
   performing a subsequent process on the semiconductor device based on the semiconductor device being determined to be normal,
   wherein the acquiring of the hologram image comprises:
   producing interference light through self-interference of reflected light from the semiconductor device by a self-interference generator (SIG) included in the pupil ellipsometry measurement apparatus; and
   detecting the hologram image of the interference light on a pupil plane by a first detector included in the pupil ellipsometry measurement apparatus.

2. The method of claim 1, wherein the SIG comprises a polarizing prism and a first polarizer,
   wherein in the producing of the interference light, the reflected light is split into two polarized beams by the polarizing prism, the two polarized beams having different polarization, and the self-interference occurs when the two polarized beams are changed by the first polarizer to have a common polarization component and combined on the pupil plane.

3. The method of claim 2, wherein the reflectance information comprises an intensity ratio and a phase difference between the two polarized beams of the self-interference, and
   wherein the reflectance information is compared with reference information stored in a database when measuring the semiconductor device.

4. The method of claim 1, wherein the reconstructing of the reflectance information comprises:
   performing a Fourier transform for the hologram image;
   performing peak finding to find a peak signal for an interference component in a Fourier transformed signal;
   performing digital masking to extract the peak signal;
   performing mask centering to move the peak signal to a center; and
   performing an inverse Fourier transform for the peak signal, and
   wherein complex data for the interference component is acquired through the inverse Fourier transform, and the reflectance information is calculated based on the complex data.

5. The method of claim 4, further comprising:
   acquiring a reference hologram image with respect to a reference sample for calibration;
   reconstructing reference reflectance information based on the reference hologram image; and
   normalizing the reflectance information of the semiconductor device based on the reference reflectance information.

6. The method of claim 5, further comprising, after the normalizing of the reflectance information, calculating a polarization component change based on an azimuthal angle of light incident to the semiconductor device and calibrating the reflectance information.

7. The method of claim 1, wherein the acquiring of the hologram image further includes:
generating and outputting light by a light source unit included in the pupil ellipsometry measurement apparatus;
polarizing the light from the light source unit by a second polarizer included in the pupil ellipsometry measurement apparatus; and
focusing light from the second polarizer on the semiconductor device by an objective lens included in the pupil ellipsometry measurement apparatus.

8. The method of claim 7, wherein the generating and outputting of the light comprises outputting monochromatic light by a monochromator included in the light source unit, and
wherein the monochromatic light is polarized by the second polarizer, and focused on the semiconductor device by the objective lens.

9. The method of claim 7, wherein the pupil ellipsometry measurement apparatus comprises first beam splitter and a second beam splitter,
wherein the first beam splitter is configured to direct the light from the second polarizer to the objective lens, and direct the reflected light to a second beam splitter, the reflected light being incident through the objective lens, and
wherein the second beam splitter is configured to direct a portion of the reflected light from the first beam splitter to the first detector and direct a remaining portion of the reflected light to the SIG.

10. The method of claim 1, wherein the reconstructing of the reflectance information comprises reconstructing the reflectance information based on all pixels of the hologram image, and
wherein each of the pixels provides reflectance information corresponding to a different incident angle and a different azimuthal angle with respect to the semiconductor device.

11. A method of fabricating a semiconductor device, the method comprising:
producing interference light through self-interference of reflected light from a semiconductor device to be measured by a self-interference generator (SIG) included in a pupil ellipsometry measurement apparatus;
detecting a hologram image of the interference light on a pupil plane by a first detector included in the pupil ellipsometry measurement apparatus;
detecting an image of the reflected light on an imaging plane by a second detector included in the pupil ellipsometry measurement apparatus;
reconstructing reflectance information based on the hologram image;
measuring the semiconductor device based on the reflectance information;
determining whether the semiconductor device is normal based on a result of the measuring; and
performing a subsequent process on the semiconductor device based on the semiconductor device being determined to be normal.

12. The method of claim 11, wherein the SIG comprises a polarizing prism and a first polarizer,
wherein in the producing of the interference light, the reflected light is split into two polarized beams by the polarizing prism, the two polarized beams having different polarization, and the self-interference occurs when the two polarized beams are changed by the first polarizer to have a common polarization component and combined on the pupil plane, and
wherein the reflectance information comprises an intensity ratio and a phase difference between the two polarized beams of the self-interference.

13. The method of claim 11, wherein the reconstructing of the reflectance information comprises:
performing a Fourier transform for the hologram image;
performing peak finding to find a peak signal for an interference component in a Fourier transformed signal;
performing digital masking to extract the peak signal;
performing mask centering to move the peak signal to a center; and
performing an inverse Fourier transform for the peak signal, and
wherein complex data for the interference component is acquired through the inverse Fourier transform, and the reflectance information is calculated based on the complex data.

14. The method of claim 13, further comprising:
acquiring a reference hologram image with respect to a reference sample for calibration;
reconstructing reference reflectance information based on the reference hologram image; and
normalizing the reflectance information of the semiconductor device based on the reference reflectance information.

15. The method of claim 11, wherein the acquiring of the hologram image further includes:
generating and outputting light by a light source unit included in the pupil ellipsometry measurement apparatus;
polarizing the light from the light source unit by a second polarizer included in the pupil ellipsometry measurement apparatus; and
focusing light from the second polarizer on the semiconductor device by an objective lens included in the pupil ellipsometry measurement apparatus, and
wherein the generating and outputting of the light comprises outputting monochromatic light by a monochromator included in the light source unit.

16. A method of fabricating a semiconductor device, the method comprising:
preparing the semiconductor device to be measured;
acquiring a hologram image of the semiconductor device by a pupil ellipsometry measurement apparatus;
reconstructing reflectance information based on the hologram image;
measuring the semiconductor device based on the reflectance information;
determining whether the semiconductor device is normal based on a result of the measuring; and
performing a subsequent process on the semiconductor device based on the semiconductor device being determined to be normal.

17. The method of claim 16, wherein the acquiring of the hologram image comprises:
producing interference light through self-interference of reflected light from the semiconductor device by a self-interference generator (SIG) included in the pupil ellipsometry measurement apparatus;
detecting the hologram image of the interference light on a pupil plane by a first detector included in the pupil ellipsometry measurement apparatus; and detecting an image of the reflected light on an imaging plane by a second detector included in the pupil ellipsometry measurement apparatus.

18. The method of claim 17, wherein the reconstructing of the reflectance information comprises:
   performing a Fourier transform for the hologram image;
   performing peak finding to find a peak signal for an interference component in a Fourier transformed signal;
   performing digital masking to extract the peak signal;
   performing mask centering to move the peak signal to a center; and
   performing an inverse Fourier transform for the peak signal, and
   wherein complex data for the interference component is acquired through the inverse Fourier transform, and the reflectance information is calculated based on the complex data.

19. The method of claim 17, wherein the acquiring of the hologram image further includes:
   generating and outputting light by a light source unit included in the pupil ellipsometry measurement apparatus;
   polarizing the light from the light source unit by a second polarizer included in the pupil ellipsometry measurement apparatus; and
   focusing light from the second polarizer on the semiconductor device by an objective lens included in the pupil ellipsometry measurement apparatus,
   wherein the generating and outputting of the light comprises outputting monochromatic light by a monochromator included in the light source unit, and
   wherein the detecting of the hologram image on the pupil plane comprises detecting an image of the reflected light on an imaging plane by a second detector included in the pupil ellipsometry measurement apparatus.

* * * * *